(12) United States Patent
Holt et al.

(10) Patent No.: US 9,207,979 B1
(45) Date of Patent: Dec. 8, 2015

(54) EXPLICIT BARRIER SCHEDULING MECHANISM FOR PIPELINING OF STREAM PROCESSING ALGORITHMS

(71) Applicants: James C. Holt, Austin, TX (US); Joseph P. Gergen, Manchaca, TX (US); David B. Kramer, Cedar Park, TX (US); William C. Moyer, Dripping Springs, TX (US)

(72) Inventors: James C. Holt, Austin, TX (US); Joseph P. Gergen, Manchaca, TX (US); David B. Kramer, Cedar Park, TX (US); William C. Moyer, Dripping Springs, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 38 days.

(21) Appl. No.: 14/288,541

(22) Filed: May 28, 2014

(51) Int. Cl.
*G06F 9/46* (2006.01)
*G06F 9/48* (2006.01)
*G06F 9/38* (2006.01)

(52) U.S. Cl.
CPC ............ *G06F 9/4881* (2013.01); *G06F 9/3867* (2013.01)

(58) Field of Classification Search
CPC .................................................... G06F 9/4881
USPC .................................................. 718/102–108
See application file for complete search history.

(56) References Cited

U.S. PATENT DOCUMENTS

| | | | |
|---|---|---|---|
| 6,295,601 B1 * | 9/2001 | Steele, Jr. ............ | G06F 9/30087 712/244 |
| 6,967,926 B1 | 11/2005 | Williams, Jr. et al. | |
| 6,973,650 B1 * | 12/2005 | Parkes ................. | G06F 9/4843 711/118 |
| 7,735,088 B1 * | 6/2010 | Klausler ................. | G06F 9/485 718/100 |
| 8,139,488 B2 | 3/2012 | Williams, Jr. et al. | |
| 2011/0063313 A1 * | 3/2011 | Bolz ...................... | G06T 15/005 345/531 |
| 2014/0130052 A1 * | 5/2014 | Lin ........................... | G06F 9/38 718/102 |

OTHER PUBLICATIONS

Duncan, Ralph, and Peder Jungck. "packetC language for high performance packet processing." High Performance Computing and Communications, 2009. HPCC'09. 11th IEEE International Conference on. IEEE, 2009, pp. 450-457.*
Sampson, Jack, et al. "Exploiting fine-grained data parallelism with chip multiprocessors and fast barriers." Proceedings of the 39th Annual IEEE/ACM International Symposium on Microarchitecture. IEEE Computer Society, 2006, pp. 1-12.*
Buntinas, Darius, Dhabaleswar K. Panda, and Ponnuswamy Sadayappan. "Fast NIC-based barrier over Myrinet/GM." Parallel and Distributed Processing Symposium., Proceedings 15th International. IEEE, 2001, pp. 1-8.*

* cited by examiner

*Primary Examiner* — Satish Rampuria

(57) ABSTRACT

A method for pipelined data stream processing of packets includes determining a task to be performed on each packet of a data stream, the task having a plurality of task portions including a first task portion. Determining the first task portion is to process a first packet. In response to determining a first storage location stores a first barrier indicator, enabling the first task portion to process the first packet and storing a second barrier indicator at the first location. Determining the first task portion is to process a second next-in-order packet. In response to determining the first location stores the second barrier indicator, preventing the first task portion from processing the second packet. In response to a first barrier clear indicator, storing the first barrier indicator at the first location, and in response, enabling the first task portion to process the second packet.

19 Claims, 9 Drawing Sheets

EXPLICIT BARRIER SCHEDULING MECHANISM FOR PIPELINING OF STREAM PROCESSING ALGORITHMS

FIELD OF THE DISCLOSURE

This disclosure generally relates to data processing, and more particularly to data processing using barrier scheduling.

BACKGROUND

A network packet processing system can be viewed as a stream processing system in which packets of a data stream are the data items. A stream processing system can process multiple streams of input data packet-by-packet to produce multiple streams of output data based upon the packets. Input packets within a data stream can have a particular order amongst them and often require that input packets be processed in that particular order (in-order processing) and that each input packet be subject to the same process flow. For example, the processing of input packets within a data stream using a stream processing algorithm is often arranged as a pipeline of independent processing steps (stages), where each input packet of a particular data stream goes through all of the processing pipeline stages. If a data stream is an ordered data stream, the input packets should be processed in-order. For some data streams the processing of the input packets is stateful in that there is global stream context data that needs to be maintained. For example, monitoring and statistics information may be gathered and maintained per data stream by accessing and updating state information in a memory where the data stream's global stream context data is maintained during processing the data stream. This per stream context data is global in that it may be shared by one or more of the data stream's independent processing pipeline stages. As a further example, the processing can be stateful in that a data stream processing system may provide a mechanism, for example, locks or semaphores, to guarantee atomicity of access to the shared per stream global stream context data by each independent processing stage. However, locks and semaphores may have high processing overhead and may result in higher latency than desired.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
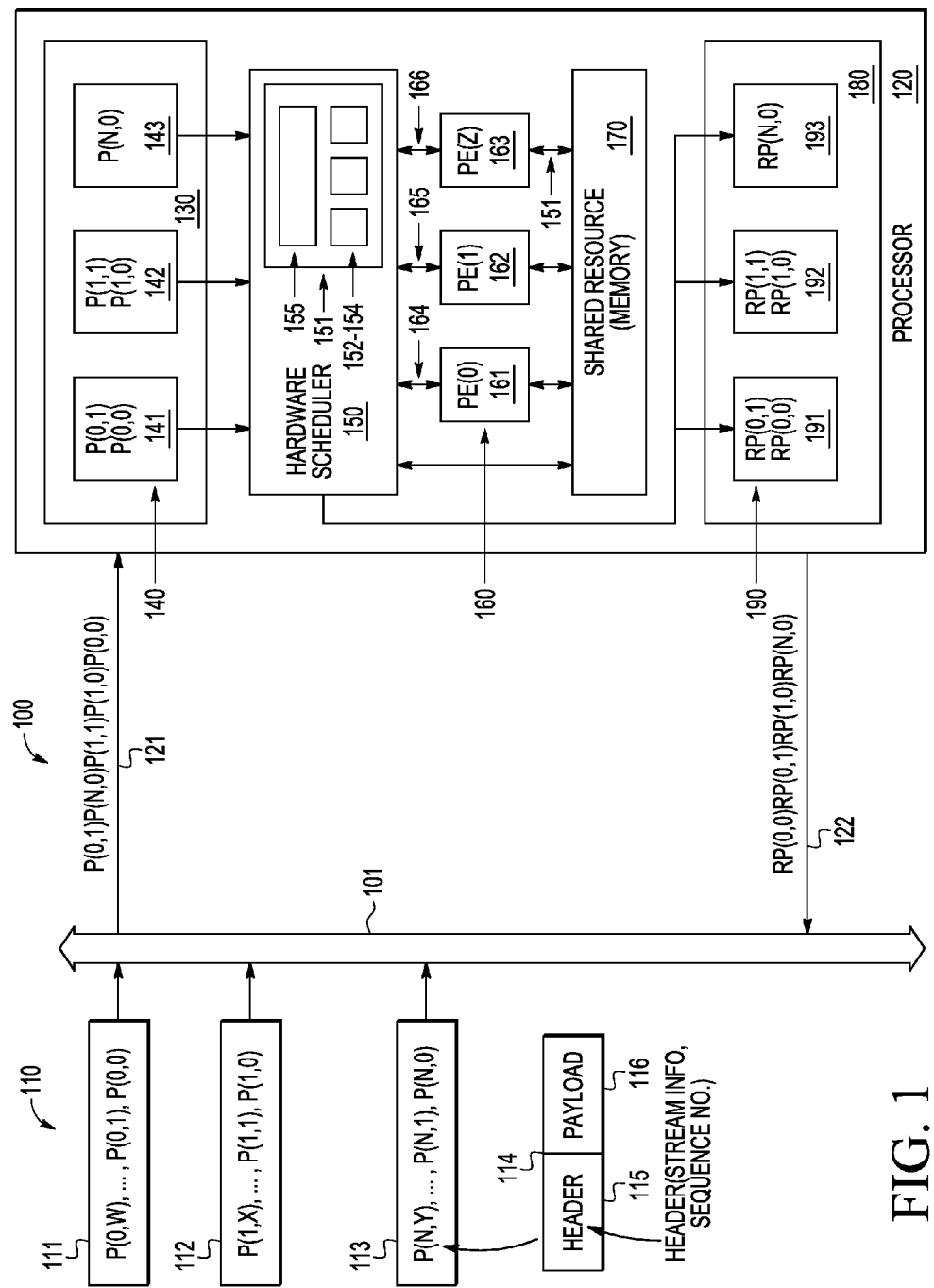
FIG. 1 illustrates a processing system that schedules processing of data stream packets in a pipelined manner in accordance with at least one embodiment of the present disclosure.

An embodiment of a processing system is disclosed that schedules processing of multiple streams of input data packet-by-packet in a pipelined manner to produce multiple streams of output data based upon the packets. The packets of a specific input data stream can have a particular order amongst them (an ordered data stream) and can require that the data stream packets be processed in that particular order. For example, packets of an ordered data stream received at the processing system (ingress order) can be processed in-order such that the processing order and the egress order of the output data matches the ingress order. The processing of input packets within a data stream can use a data stream processing algorithm arranged as a pipeline of independent processing stages, where each input packet goes through all of the processing pipeline stages. If a data stream is an ordered data stream, the input packets can be processed in-order. Per stream global context data associated with a particular data stream can be shared and maintained by one or more of the data stream's independent processing stages.

According to an embodiment, the processing system can utilize a hardware scheduler module and barrier scheduling mechanisms to schedule processing of next-in-order packets of a particular ordered data stream through each one of the independent processing stages in pipeline stage order. The processing system processes next-in-order packets in data stream packet order while also ensuring atomicity of conflict section, also referred herein as conflict section, accesses and updates to the shared per stream global context data by each independent processing stage.

The hardware scheduler module schedules the next-in-order packet of the ordered data stream on an available next-in-order stage of the pipeline, enables the next-in-order stage to process the next-in-order packet, and sets a barrier for the next-in-order stage to block processing of any subsequent next-in-order packets of the ordered data stream. After setting the barrier, the hardware scheduler module waits for another next-in-order packet to become available before proceeding as described above.

In response to being enabled by the hardware scheduler module, the next-in-order stage executes the data stream processing sub-algorithm for the next-in-order stage and performs any conflict section processing including accesses and updates to the shared per stream global context data. Upon completion, the next-in-order stage communicates a barrier clear to the hardware scheduler module indicating that the next-in-order stage processing of the next-in-order packet has completed, that the next-in-order stage is available to process a subsequent next-in-order packet, and that the next-in-order packet is ready to proceed to the subsequent next-in-order stage.

In response to a barrier clear being received from the next-in-order stage for the next-in-order packet, the hardware scheduler module clears the barrier to make the next-in-order stage available. The hardware scheduler module determines the subsequent next-in-order stage that is to process the next-in-order packet and proceeds as previously described. In this manner, the processing system ensures that each packet of its ordered data stream is processed through each stage of the corresponding data stream pipeline in stage order, that subsequent next-in-order packets to the next-in-order packet being processed are prevented from entering an occupied stage, that conflict section processing including accesses and updates to shared per stream global context data are low-latency and performed atomically as only one packet can occupy a stage at a time, that an occupied stage only becomes available when a barrier clear for the occupied stage is received, and that each packet completes processing through its corresponding data stream pipeline in data stream packet order. As described herein, the processing system achieves this without the use of locks and semaphores while avoiding possible race conditions.

FIG. 1 illustrates a processing system 100 that schedules processing of data stream packets in a pipelined manner. The processing system 100 includes a communication network 101, input/output (I/O) interfaces 121, and 122, a processor 120. Other devices (not shown) can provide various data streams, such as data streams 110 (data streams 111-113). The processor 120 is connected to the communication network 101 via I/O interfaces 121, and 122. In an embodiment, the communication network 101 can be the Internet, a local area network, a crossbar switch, or any networking communication protocol.

Processor 120 includes a memory 130, a hardware scheduler 150, one or more processing elements shown herein as multiple processing elements 160 (processing elements PE(0) 161, PE(1) 162, and PE(Z) 163), a shared resource memory 170, and a memory 180. The processor 120 also includes interconnects 164, 165, and 166 (interconnects 164-166) between the hardware scheduler 150 and corresponding ones of the processing elements 161-163, respectively, that enable the hardware scheduler 150 and the multiple processing elements to communicate. Each of the processing elements 160 are connected to the shared resource memory 170, as is the hardware scheduler 150. In addition, the hardware scheduler 150 is connected to the memories 130, and 180. The various interconnects disclosed herein are used to communicate information between various modules either directly or indirectly. For example, an interconnect can be implemented as a passive device, such as conductive nodes that include one or more conductive traces, that transmits information directly between various modules, or as an active device, wherein information being transmitted is buffered, for example, stored and retrieved, in the process of being communicated between devices, such as at a first-in first-out memory or other memory device. In addition, a label associated with an interconnect can be used herein to refer to a signal and information transmitted by the interconnect.

Memory 130 can include memory where multiple input packet data stream queues 140 (input packet data stream queues 141-143) are implemented, one for each data stream, where input packet data is stored prior to being provided to the hardware scheduler 150. The hardware scheduler 150 can include a memory 151 for maintaining a stream context table 155 with an entry for each active data stream. The hardware scheduler 150 can also include multiple memory regions 152-154 at memory 151 for maintaining stream specific information, one memory region for each active data stream. According to an embodiment, information stored at the stream context table 155 can be used to access information for specific streams stored at memory regions 152-154. Depending on the embodiment, the memory 151 may be located local to the hardware scheduler 150 or in another memory resource, such as at the shared resource memory 170.

The hardware scheduler 150 can send data packets to one or more of the processing elements 160 for processing via interconnects 164-166. By way of example, each one of the interconnects 164-166 is presumed to include a conductive node through which the hardware scheduler provides an indicator to a corresponding processing element to enable the processing element to process a next-in-order packet in response to a barrier indicator corresponding to the processing element that is maintained at the hardware scheduler 150 being cleared. By way of further example, each one of the interconnects 164-166 further includes another conductive node through which the processing element provides an indicator to the hardware scheduler to indicate when a barrier being maintained for the benefit of the processing element is to be cleared. Upon completion of packet processing, the processed packet data can be retired at output packet data stream queues of memory 180. The operation of the hardware scheduler and the processing elements will be discussed in greater detail with respect to FIGS. 2-9 below.

During operation, packets are received for each one of a plurality of data streams, and are stored at a corresponding input packet data stream queue. For example, three data streams 111-113 are illustrated as being communicated via network 101 to the processor 120. As illustrated, each data stream 111-113 comprising a plurality of packets, where the packets of each data stream are ordered and each packet includes a portion of its data stream's information. The packets of ordered data stream 111 are represented by the mnemonic P(0,n) where 0 indicates the packet is associated with ordered data stream 111, and n is an integer indicating the ordered location of the packet within the ordered data steam. Thus the first-in-order packet of ordered data stream 111 is represented by n=0, and the last-in-order packet is represented by n=W. The packets of ordered data steam 112 are represented by the mnemonic P(1,n) where 1 indicates the packet is associated with ordered data stream 112, and the last-in-order packet is represented by n=X. The packets of ordered data steam 113 are represented by the mnemonic P(N,n) where N indicates the packet is associated with ordered data stream 113, and the last-in-order packet is represented by n=Y.

Each ordered data stream packet has a format as indicated by representative packet 114, which includes stream centric information, for example, the stream data being transmitted by the packet, which may be referred to as packet data or the payload 116 of the packet 114, and packet centric information, which may be referred to as the packet header, or the header 115 of the packet 114. Each header 115 of the packet 114 is represented herein by the mnemonic Header (Stream Info, Sequence No.) where Stream Info includes information that indicates which ordered data stream the packet is associated with, and Sequence No. can be an integer indicating the ordered location of the packet within the ordered data stream, which may be referred to as the packet's sequence number.

Examining the packet header to determine which ordered data stream the packet belongs to is referred to herein as packet classification and may be performed in various manners. In an embodiment, the Stream Info information of the header can include information in each packet's header 115 which provides an indication of the source. Alternatively, the information may provide an indication of the source and the destination, or an indication of the source, the destination and other information regarding the multiplexing of logical multiplexing of multiple communication channels. By way of example, packets having the same source and destination addresses and multiplexing ID belong to the same ordered data stream. In another embodiment, each packet's header 115 can contain information fields that make up the Stream Info information. The information fields are matched by a set of rules maintained by the pipelined scheduler data stream processing system 100, where the rules classify which ordered data stream each packet 114 belongs to based on the rule's criterion on the information fields of the packet header 115. For example, the processor 120 can include a classification module which can be implemented in hardware, software, or a combination of both hardware and software.

Thus, packet classification determines which specific ordered data stream each packet belongs to based upon the Stream Info information in each packet's header. Packet classification may further determine a Stream ID for each packet, where the Stream Info information in the packet's header is bound to the Stream ID for the specific ordered data stream the packet belongs to.

The packet header 115 may also include the packet's sequence number where the sequence number may be used to determine the packet's order in its ordered data stream 111-113. In an exemplary embodiment, consecutive sequence numbers are assigned to consecutive packets 114 within each one of the ordered data streams 110, wherein the first-in-order packet is represented by sequence number=0. In another embodiment, the first-in-order packet may be represented by a sequence number >0 that has been communicated from each source device of its ordered data stream to the pipelined scheduler data stream processing system 100. In another embodiment the sequence number may increment as a function of the payload size of the data packets. In an embodiment, packets 114 of an ordered data stream 111-113 may be received by the processor 120 out-of-order. The processor 120 may utilize the packet's sequence number to detect whether a packet 114 has been received out-of-order and delay storing the out-of-order packet 114 at its corresponding input packet data stream queue until all of the preceding packets 114 of its ordered data stream have been received and stored at the corresponding input packet data stream queue. In this way, a packet 114 that was received out-of-order prior to a preceding packet being received will not be processed out-of-order.

For purposes of discussion, it is presumed that packets 114 of an ordered data stream 111-113 are received by the processor 120 in-order and are stored at their corresponding input packet data stream queue sequentially in data stream packet order.

For each ordered data stream, processor 120 can include stream specific configuration information that can: include information comprising the Stream Info of each packet's header; define how packet classification is to be performed on each packet; define packet classification rules; define how Stream IDs are determined for each packet and associated with each specific ordered data stream; assign the sequence number that represents the first-in-order packet; and define an inactivity threshold time for each specific ordered data stream and what should happen when the inactivity threshold time is exceeded. By way of example, the processor 120 may keep track of the time that the last packet of each ordered data stream was received. The last packet received time allows the processor 120 to determine if the ordered data stream has exceeded its inactivity threshold time. In an embodiment, processor 120 may de-allocate and free up the data stream resources that are associated with the specific ordered data stream based on the inactivity threshold time being exceeded.

In an embodiment, the processor 120 can pre-configure the stream specific configuration information during any type of configuration process of the pipelined scheduler data stream processing system 100 prior to any data being received at the processor 120. Alternatively, the processor 120 can provide the stream specific configuration information during initialization, restart, or upon receipt of a first-in-order packet of an ordered data stream. The processor 120 can store the stream specific configuration information at memory 151.

When the first-in-order data packet of an ordered data stream, presumed to be ordered data stream 111, packet P(0,0), is received by processor 120, a queue manager (not shown) of processor 120 allocates an input packet data stream queue 141 in memory 130 and associates the queue with ordered data stream 111. The data packets of ordered data stream 111 are then stored at input packet data stream queue 141. For purposes of discussion, it is presumed that the data packets of ordered data stream 111 are stored at the input packet data stream queue sequentially in data stream packet order. Similarly, when the first-in-order data packet of ordered data stream 112, packet P(1,0), is received by processor 120, an input packet data stream queue 142 is allocated in memory 130 and associated with ordered data stream 112. The data packets of ordered data stream 112 are then stored at input packet data stream queue 142. In the same way, the data packets of ordered data stream 113 are stored at input packet data stream queue 143, after the processor 120 allocated input packet data stream queue 143 in memory 130 upon receipt of the first-in-order data packet of ordered data stream 113, packet P(N,0).

Similarly, after being processed by processor 120, the output data based on the input data packets of an ordered data stream, which is generically referred to herein as output data packets of the output ordered data stream, are stored in data stream packet order at the corresponding output packet data stream queue 191-193. Thus, RP(0,0) at memory portion 191 of memory 180 represents the output data that is generated in response to packet P(0,0) being completely processed, and is referred to herein as packet RP(0,0), even though the data may or may not be formatted as an actual packet. It will be appreciated that a packet, for example packet P(0,0), may produce multiple output packets, for example packet P(0,0) may be an encapsulated stream that de-multiplexes into multiple output data packets RP(0,0) and RP(0,1). In the same manner, output packet data stream queues 192 and 193 are allocated in memory 180 and associated with their corresponding output ordered data streams 112 and 113, respectively. The retired packets shown in the multiple output packet data stream queues 190 (output packet data stream queues 191-193) are the same packets from the multiple input packet data stream queues 140, after they have been processed by processor 120. Note the output data based on the processed input packets may not be actual packets. Each retired packet completes data stream processing in data stream packet order and is then placed in its corresponding output packet data stream queue 191-193. In this manner, data stream packet order within each output packet data stream queue is maintained.

Each packet of the data streams 110 is routed through the communication network 101 to the processor 120 through I/O interface 121 based upon information in the packet's header. When the processor 120 receives packets 114 of each of the ordered data streams 110, processor 120 performs packet classification, as previously described, to determine which specific ordered data stream 111-113 each packet 114 belongs to, which determines the packet's Stream ID, where packets having the same Stream ID belong to the same ordered data stream. The processor 120 then adds the packet 114 to the appropriate input packet data stream queue 141-143 based on the packet's Stream ID. The processor 120 also updates a last packet received time associated with the specific ordered data stream, hence the specific Stream ID, with the current time, indicating that the last packet received time is the time that packet 114 was just added to its input packet data stream queue 141-143. The last packet received time allows the processor 120 to determine if the ordered data stream has exceeded its inactivity threshold time. In an embodiment, processor 120 may de-allocate and free up the data stream resources that are associated with the specific ordered data stream based on the inactivity threshold time being exceeded.

The processor 120 can determine the pipelined data stream processing algorithm, also referred herein as a task, to be implemented on a packet based upon the Stream ID. The processing algorithm for each corresponding ordered data stream can include a specific order of sub-algorithms, also referred herein as task portions, hence specifying a sequence of pipelined data stream processing stages, where a processing stage can be executed at one or more processing elements, such as one or more of a general purpose instruction-based processor, a specific purpose processing device, which can be an instruction-based processor or a state machine.

Each pipelined data stream processing stage may include a set of instructions for a general purpose instruction-based processor that implement the software sub-algorithm, a set of commands for a specific purpose processing device, for example, a set of security device commands, a set of encryption device commands, a set of decryption device commands, a set of statistics device commands, and the like, that implement the hardware sub-algorithm, or a combination of a set of instructions for a general purpose instruction-based processor and a set of commands for a specific purpose processing device that together implement the combined software and hardware sub-algorithm, wherein the set of instructions for the general purpose instruction-based processor and/or the set of commands for the specific purpose processing device can be stored in the shared resource memory 170 by the processor 120 so that they are accessible by the one or more processing elements 160.

Arranging the processing of packets 114 as a sequence of pipelined data stream processing stages, allows multiple packets of an ordered data stream to be processed simultaneously, where two or more packets of a data stream may be at different pipelined data stream processing stages at a given time. Each one of the pipelined data stream processing algorithms (tasks) may be implemented with a different number of pipelined data stream processing stages, and enabling one or more different processing elements. For example, one or more of a general purpose instruction-based processor or a specific purpose processing device can correspond to a pipelined data stream processing stage that executes a sub-algorithm. Such a stage can access and update a segment of the data stream's context data at one of memory portions 152-154.

Figure 2:
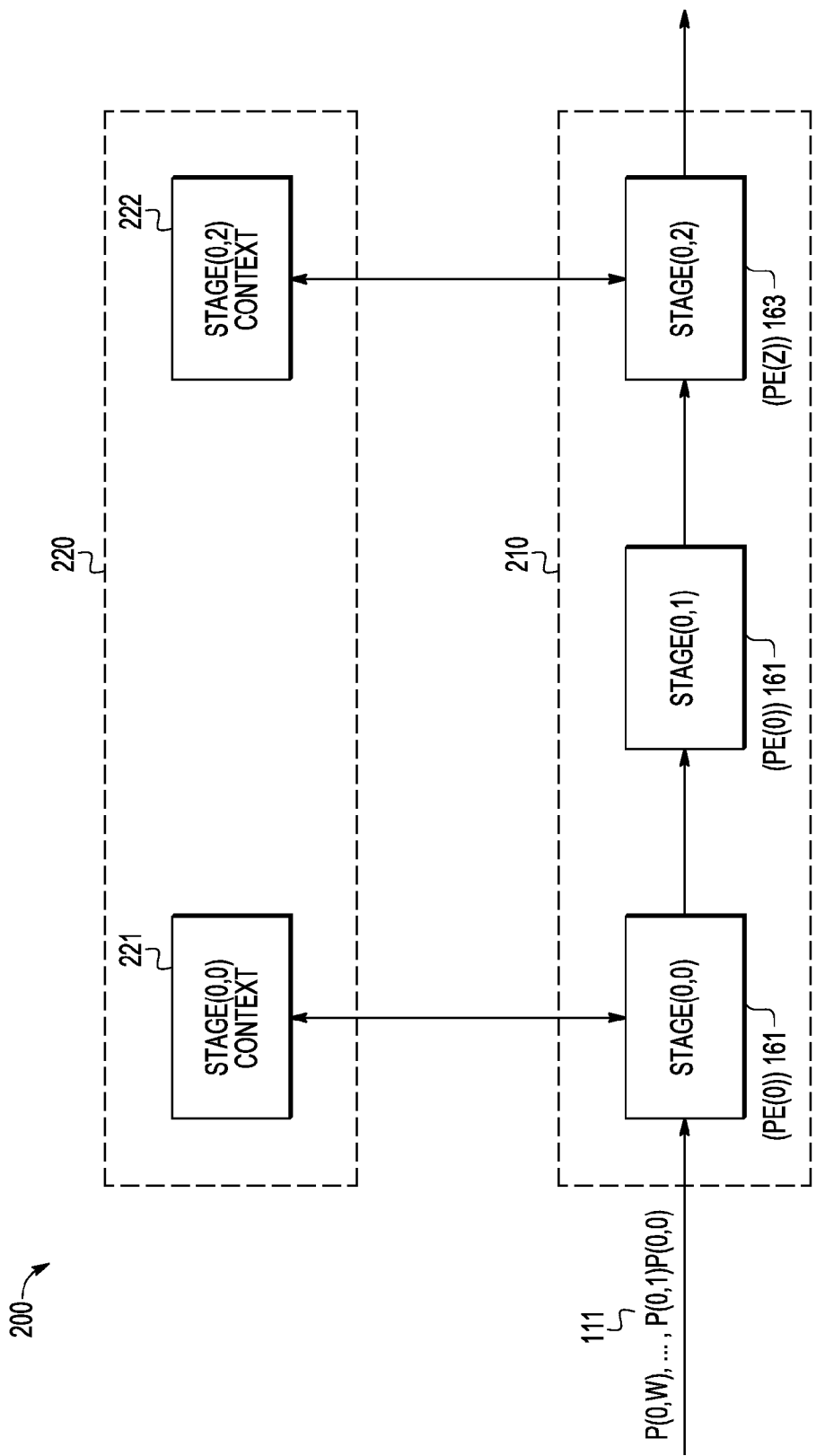
FIG. 2 illustrates a multi-stage pipelined data stream processing algorithm including stream context data and multiple processing elements in accordance with at least one embodiment of the present disclosure.

FIG. 2 illustrates a particular pipelined data stream processing algorithm 200 represented by stream context data 220 and multiple processing elements 160 for processing packets of an ordered data stream 111. In this embodiment, the algorithm is shown to include three pipelined data stream processing stages represented by the mnemonic Stage(0,n) where 0 indicates the stage is associated with ordered data stream 111, and n is an integer indicating the stage number of the particular pipelined data stream processing algorithm 200, wherein the first-in-order stage is represented by n=0 and the last-in-order stage is represented by n=2. Each stage implements a portion of the particular pipelined data stream processing algorithm for ordered data stream 111 on one of the processing elements 160 described earlier with respect to FIG. 1. By way of example, the first two stages, Stage(0,0) and Stage(0,1), are both executed at PE(0) (FIG. 1) and the last-in-order stage, Stage(0,2) is executed at PE(Z). According to an embodiment, PE(0) can be a general purpose instruction-based processor (GPP), and PE(Z) can be a GPP or a specific purpose processing device, such as a security processing device.

Each stage can be associated with a respective set of context data, which can be stored at the memory region 152. In addition, the stream context data 220 can be segmented into separate context data for each stage. As illustrated, the stream context data 220 includes two stage context data areas 221 and 222 represented by the mnemonic Stage(0,n) Context where 0 indicates the stage context data is associated with ordered data stream 111, and n is an integer indicating the stage number the stage context data is associated with, wherein the first-in-order stage is represented by n=0. In this embodiment, the second next-in-order stage, Stage(0,1), does not have any stage context data associated with it. During operation each packet of the ordered data stream 111 is processed by the pipelined data stream processing algorithm 210 in data stream packet order, one stage at a time, in stage order. According to a particular embodiment, only one packet may occupy a stage at a time. Pipeline efficiency is achieved when Stage(0,2) is processing packet P(0,0), Stage(0,1) is processing packet P(0,1) and Stage(0,0) is processing packet P(0,2). The scheduling of the next-in-order packets on available stages by the hardware scheduler, the atomicity of accesses, and updates to the stage context data areas associated with ordered data stream 111, maintaining packet processing in data stream packet order and in stage order, and the communication between the plurality of stages and the hardware scheduler will be discussed in detail below.

Referring back to FIG. 1, the pipelined scheduler data stream processing system 100 may include at memory 151 a memory portion 155 where a stream context table that is global relative to the plurality of streams is stored, and a plurality of stream specific memory locations 152-154, one for each stream, where stream specific information is stored. Stream specific information stored at each one of the memory locations 152-154 can include stream-specific context information, such as Stage(0,0) context information of FIG. 2, and stream workflow information that can be used to ensure packets of ordered data streams are processed by each ordered data stream's data stream pipeline in data stream packet order, and to ensure atomicity of accesses and updates to each ordered data stream's stream context data.

Table 1 depicts an example embodiment of a stream context table 155, at time T0, after system configuration has completed, that illustrates a particular embodiment of stream context information that is global relative to a plurality of streams, and that can be maintained for use by the hardware scheduler 150.

TABLE 1

Stream Context Table 155
Time T0

| Stream ID | PTR to Stream Context | PTR to Stream Workflow Table | No. Task Portions/Stages |
|---|---|---|---|
| Stream(0) | ADDR_SC(0) | ADDR_SWFT(0) | 3 |
| Stream(1) | ADDR_SC(1) | ADDR_SWFT(1) | 2 |
| Stream(N) | ADDR_SC(N) | ADDR_SWFT(N) | 4 |

The first column, labeled "Stream ID", contains the Stream ID of each currently active ordered data stream, where the Stream ID can be determined based upon the packet header information as previously described.

The next column, labeled "PTR to Stream Context", is the address in the stream-specific memory where a corresponding ordered data stream's specific stream context data is located, for example, one of memory locations 152-154. Thus, the entry ADDR_SC(0) represents the address where the Stream Context data for Stream(0) is stored, which is presumed to be a location of one of the memory portions 152-154. The stream context data can be further segmented into separate independent stage context data areas as will be described in greater detail herein.

The next column, labeled "PTR to Stream Workflow Table", is the address in the stream-specific memory, for example, one of locations 152-154, where a corresponding ordered data stream's stream workflow table (or stream stage table) is located. As illustrated, the entry ADDR_SWFT(0) represents the address where the stream workflow table for Stream(0) is stored. The workflow table of a stream stores information that defines both the pipelined data stream processing algorithm and resources required and the status of the data stream pipeline.

The last column, labeled "No. Stages", is an integer value that indicates the number of stages in a specific ordered data stream's data stream pipeline, as will be discussed in greater detail herein. It will be appreciated that the various memory locations associated with memory 151 may be associated with a memory local to the hardware scheduler 150, or with one or more other memories, which may or may not be specifically represented at FIG. 1.

In an embodiment, each separate independent stage context data segment, for example, data of Stage(0,0) context, of the stream context data is M bytes in length, where M may be in word, or 4 byte, multiples. For example, the total size of the stream context data area for ordered data stream 111 in bytes is size=3M, and the address in memory of the stream context data and the address of each separate independent stage context data segment of the stream context data in memory may be on a word, or 4 byte, boundary. The address of each separate independent stage context data segment of the stream context data is address="PTR to Stream Context"+M×"stage number", wherein the address in memory of the first separate independent stage context data segment of the stream context data is address="PTR to Stream Context", and the address in memory of the last separate independent stage context data segment of the stream context data is address="PTR to Stream Context"+2M.

Table 2 depicts an example embodiment of a stream workflow table stored at memory region 152, at time T0, that indicates the various stages that operate on the packets of ordered data stream 111, Stream(0).

TABLE 2

Stream Workflow Table for Stream(0)
Time T0

| Stream Stage ID | PTR to Workflow | Current Packet | Stage Barrier Indicator | Blocked Queue PTR (Status) |
|---|---|---|---|---|
| Stage(0,0) | ADDR_WF(0,0) | — | Available | (Empty) |
| Stage(0,1) | ADDR_WF(0,1) | — | Available | (Empty) |
| Stage(0,2) | ADDR_WF(0,2) | — | Available | (Empty) |

The first column, labeled "Stream Stage ID", contains an identifier for each Stream Stage ID that is used to implement a specific algorithm on the packets of Stream(0). The Stream Stage IDs are represented by the mnemonic Stage(0,n), where 0 indicates the stage is associated with Stream(0) and n is an integer value indicating the in-order stage number, wherein the first-in-order stage of the data stream pipeline is represented by n=0, and the last-in-order stage of the data stream pipeline is represented by n=2.

The next column, labeled "PTR to Workflow", is the address in memory that identifies the resources required to implement a specific stage. The information stored at the address location can include information identifying the type of processing element needed, an address location where instructions to be executed are stored, and the like.

The next column, labeled "Current Packet", contains the packet identifier of the packet of the ordered data stream that currently occupies the corresponding stage.

The next column, labeled "Stage Barrier Indicator", contains an indicator referred to as a "stage barrier indicator" that indicates the status of a corresponding stage and may have an indicator of "Available", or "Blocked", wherein an Available indicator indicates the stage is available to process a next-in-order packet, and a Blocked indicator indicates that the stage is not available to process a next-in-order packet.

The last column, labeled "Blocked Queue PTR (Status)", contains an indicator as to whether there is a packet available for processing in a queue corresponding to Stream(0). By way of example, the field is empty when no packets are available, and a pointer to the next-in-order available packet is listed when available but blocked.

Table 2 represents an example stream workflow table for ordered data stream 111, Stream(0), that has three entries, one for each stage of the data stream pipeline 210. Each row of Table 2 corresponds to a specific in-order stage of the workflow. For example, the first row of Table 2 is for the first-in-order stage of the data stream pipeline that processes the packets of Stream(0). A first column of each row, labeled Stream Stage ID, indicates an identifier for that row's corresponding in-order stage. Thus, the indicator Stage(0,0) is the Stream Stage ID of the first-in-order stage of the processing algorithm for Stream(0). The next column, labeled "PTR to Workflow" stores an address location that indicates where that stage's workflow information, such as a set of instructions, can be accessed. Thus, the address containing instructions, or other information indicating how Stage(0,0) is to be executed, can be found at ADDR_WF(0,0).

A next column, labeled "Current Packet", stores information identifying a packet that is currently being processed by a corresponding stream stage. A null value for the Current Packet indicates that no packet currently occupies the stage. A next column, labeled "Stage Barrier Indicator", stores information that indicates whether a stage is available ("Available") to process a packet or prevented ("Blocked") from processing a packet. A next column, labeled "Blocked Queue PTR (Status), stores information that indicates whether there are packets available and waiting for processing by the corresponding stage.

Table 3 is similar to Table 2 described above, and depicts an example embodiment of stream workflow table 153 for ordered data stream 112, Stream(1), at time T0.

TABLE 3

Stream Workflow Table for Stream(1)
Time T0

| Stream Stage ID | PTR to Workflow | Current Packet | Stage Barrier Indicator | Blocked Queue PTR (Status) |
|---|---|---|---|---|
| Stage(1,0) | ADDR_WF(1,0) | — | Available | (Empty) |
| Stage(1,1) | ADDR_WF(1,1) | — | Available | (Empty) |

As illustrated at Table 3, the example stream workflow table for Stream(1) has different entries than the workflow for Stream(0), thereby indicating that Stream(0) and Stream(1) are subject to different workflows. An example stream workflow table 154 for ordered data stream 113, Stream(N), similar to Table 2 and Table 3 described above, has not been shown for simplicity.

In an embodiment, the hardware scheduler 150 within the processor 120 can allocate and initialize the stream context table 155, described in detail in Table 1 above, and each ordered data stream's stream workflow table at memory regions 152-154, previously described in Table 2 and Table 3, from the stream specific configuration information stored at memory 151 during any type of configuration process prior to any data being received at the processor 120. In another embodiment, the stream specific configuration information may be stored and maintained on another dedicated processor and provided to the hardware scheduler 150 when the dedicated processor receives a request for the information from the hardware scheduler 150.

The hardware scheduler 150 can store the stream context table, for example Table 1, in a hardware scheduler data structure located in local memory 155 or located in shared resource memory 170. Similarly, the hardware scheduler 150 can store each of the stream workflow tables, for example Table 2 for ordered data stream 111 and Table 3 for ordered data stream 112, in a hardware scheduler data structure located in local memories 152-154 or located in shared resource memory 170. In other embodiments, the hardware scheduler 150 within the processor 120 can allocate and initialize the stream context table, for example Table 1, and each of the stream workflow tables, for example Table 2 for ordered data stream 111 and Table 3 for ordered data stream 112, during initialization, restart, or dynamically upon receipt of a first-in-order packet of an ordered data stream. In an embodiment, the hardware scheduler 150 can maintain, for each ordered data stream, a data stream resources pointer to the ordered data stream's data stream resources, where the data stream resources pointer stores the address of the data stream resources, or a null address if the data stream resources have not been allocated. The data stream resources pointer enables the hardware scheduler 150 to dynamically allocate and de-allocate each ordered data stream's data stream resources based on their utilization, as described above, such that the data stream resources are more efficiently managed.

A processor 120 can provide stream specific configuration information comprising information that defines for each one of a plurality of ordered data streams, a Stream ID, an inactivity threshold time, stream specific context information, and stream specific workflow information, based on different types of ordered data streams that can be received at the processor 120. Alternatively, as described above, the stream specific configuration information can be provided to the processor 120 by another processor dedicated to maintaining and providing this information. Stream specific context information includes the number of separate independent stage context data areas the Stream Context data is segmented into, and the size of each separate independent stage context data area.

The stream specific workflow information includes the number of stages in the data stream pipeline, the resources required to implement each specific stage in the data stream pipeline, including the type of processing element needed, the instructions to be executed, and the like, and the in-order stage number for each specific stage in the data stream pipeline, as previously described.

In an embodiment, the processor 120 can pre-configure the stream specific configuration information during any type of configuration process prior to any data being received at the processor 120. Alternatively, the processor 120 can provide the stream specific configuration information during initialization, restart, or upon receipt of a first-in-order packet of an ordered data stream.

The processor 120 can store the stream specific configuration information at memory 151. Thus, the stream specific configuration information includes the information needed to allocate and initialize a stream context table 155 and a plurality of stream workflow tables (or stream stage tables) 152-154, one for each corresponding ordered data stream.

In the example embodiment, the stream context table, for example, Table 1, and the per stream Stage (workflow) tables, for example, Table 2 and Table 3, have been pre-configured during a configuration process for the ordered data streams 110. The scheduling and processing of packets 114 of the ordered data streams 110 will be discussed with respect to the stream context table, Table 1, and the per stream Stage (workflow) tables, Table 2 and Table 3 as described above and Table 4 through Table 12 discussed below.

In the example embodiment, when the processor 120 receives a packet of an ordered data stream 111-113, processor 120 performs packet classification to determine to which specific ordered data stream 111-113 the packet 114 belongs and to determine the packet's Stream ID and sequence number. Upon completing packet classification, the processor 120 adds the packet to the appropriate input packet data stream queue 141-143 in data stream packet order. The processor 120 also updates a last packet received time associated with the packet's Stream ID, with the current time, indicating that the last packet received time is the time that packet 114 was just received. The last packet received time and the inactivity threshold time have not been shown in Table 1 for simplicity. The processor 120 can notify the hardware scheduler 150 when the packet has been added at the head of its input packet data stream queue 141-143 and becomes the next-in-order packet available for processing. Alternatively, the hardware scheduler 150 can determine the next-in-order packet of each one of the input packet data stream queues that is available for processing, which is the packet at the head of its queue.

When the next-in-order packet becomes available in an input packet data stream queue 141, 142, or 143, the hardware scheduler 150 de-queues the packet from its input packet data stream queue and determines the first-in-order stage that is to process the packet. In this example, the first-in-order packet of Stream(0) packet, P(0,0), which has Stream Info information corresponding to the Stream ID, Stream(0), in the packet's header that matches the first entry's Stream ID of Stream (0) in Table 1, the stream context table. The PTR to Stream Workflow Table for the Stream(0) entry in Table 1 points to stream workflow table for Stream(0), Table 2, in its initial state at time T0. Since packet P(0,0) came from the input packet data stream queue 141, the first-in-order stage of the data stream pipeline for data stream 111 is to process packet P(0,0), which is Stage(0,0), for example, the first-in-order entry of Table 2.

In response to determining that the first-in-order stage is to process packet P(0,0), the hardware scheduler 150 determines whether the first-in-order stage, Stage(0,0), is available to process packet P(0,0). As indicated at Table 2, the Stage(0, 0) is available to process packet P(0,0), as indicated by the Available indicator at row Stage(0,0), thus the hardware scheduler 150 sets the Stage Barrier Indicator value to "Blocked" and the Current Packet to "P(0,0)" for Stage(0,0) as indicated at Table 4. Thus, Stage(0,0) is blocked with respect to processing any additional packets of the Stream(0).

In further response to setting the Stage Barrier Indicator value to the Blocked indicator, the hardware scheduler 150 enables an available appropriate processing element, for example, processing element 161, to execute the sub-algorithm for the Stage(0,0) of the data stream pipeline to process the packet P(0,0) beginning at time T1. The hardware scheduler 150 sends the information to enable the processing element 161 to execute Stage(0,0) to process packet P(0,0) via the corresponding interconnect 164-166. The stage segment of the stream context data for Stage(0,0) is located in memory at address, ADDR_SC(0), as found at the PTR to Stream Context entry for Stream(0) in stream context table, Table 1. The hardware scheduler 150 determines the resources required to implement the stage of the data stream pipeline including the specific type and number of processing elements and the sub-algorithm from the PTR to Workflow address for Stage(0,0) of the data stream pipeline in Table 2. The hardware scheduler 150 then waits for a next-in-order packet to become available. Note that the stream workflow tables for the other data streams remain unchanged at time T1, as specifically illustrated with respect to the Stream Workflow Table for Stream(1) at Table 5.

TABLE 4

Stream Workflow Table for Stream(0)
Time T1

| Stream Stage ID | PTR to Workflow | Current Packet | Stage Barrier Indicator | Blocked Queue PTR (Status) |
|---|---|---|---|---|
| Stage(0,0) | ADDR_WF(0,0) | P(0,0) | Blocked | (Empty) |
| Stage(0,1) | ADDR_WF(0,1) | — | Available | (Empty) |
| Stage(0,2) | ADDR_WF(0,2) | — | Available | (Empty) |

TABLE 5

Stream Workflow Table for Stream(1)
Time T1

| Stream Stage ID | PTR to Workflow | Current Packet | Stage Barrier Indicator | Blocked Queue PTR (Status) |
|---|---|---|---|---|
| Stage(1,0) | ADDR_WF(1,0) | — | Available | (Empty) |
| Stage(1,1) | ADDR_WF(1,1) | — | Available | (Empty) |

At time T2, the next-in-order packet of Stream(0), packet P(0,1), has become available, causing the hardware scheduler 150 to update the stream workflow table for Stream(0) as indicated at Table 6 to include the indicator ADDR_P(0,1), presumed to be a pointer to the next-in-order packet, in the Blocked Queue PTR column that indicates the availability of the next-in-order packet. Thus, the hardware scheduler 150 has de-queued packet P(0,1) from input packet data stream queue 141 and determined that the available packet P(0,1) is to be processed by the first-in-order Stage(0,0) of the data stream pipeline for Stream(0), but is blocked, as indicated by the Blocked indicator stored at entry Stage(0,0). In response, the hardware scheduler 150 adds packet P(0,1) to the tail of the blocked queue, which sets the Blocked Queue PTR value to the address of the packet P(0,1) queue entry, to identify packet P(0,1) as the next-in-order packet to be processed at Stage(0,0) when it becomes available. The hardware scheduler 150 then waits for a next-in-order packet to become available.

TABLE 6

Stream Workflow Table for Stream(0)
Time T2

| Stream Stage ID | PTR to Workflow | Current Packet | Stage Barrier Indicator | Blocked Queue PTR (Status) |
|---|---|---|---|---|
| Stage(0,0) | ADDR_WF(0,0) | P(0,0) | Blocked | ADDR_P(0,1) |
| Stage(0,1) | ADDR_WF(0,1) | — | Available | (Empty) |
| Stage(0,2) | ADDR_WF(0,2) | — | Available | (Empty) |

The next packet to become available is the first-in-order packet for Stream(1), packet P(1,0), at time T3. In a similar manner as described above, and illustrated at Table 7, the hardware scheduler 150 marks Stage(1,0) as blocked with respect to further processing packets of Stream(1) and schedules processing of packet P(1,0) by Stage(1,0). The hardware scheduler 150 then waits for a next-in-order packet to become available.

TABLE 7

Stream Workflow Table for Stream(1)
Time T3

| Stream Stage ID | PTR to Workflow | Current Packet | Stage Barrier Indicator | Blocked Queue PTR (Status) |
|---|---|---|---|---|
| Stage(1,0) | ADDR_WF(1,0) | P(1,0) | Blocked | (Empty) |
| Stage(1,1) | ADDR_WF(1,1) | — | Available | (Empty) |

The execution, that began at time T1, of the sub-algorithm for Stage(0,0) of the data stream pipeline to process the packet P(0,0) of Stream(0) by processing element 161 is described in more detail with reference to FIG. 3 Stage(0,0).

Figure 3:
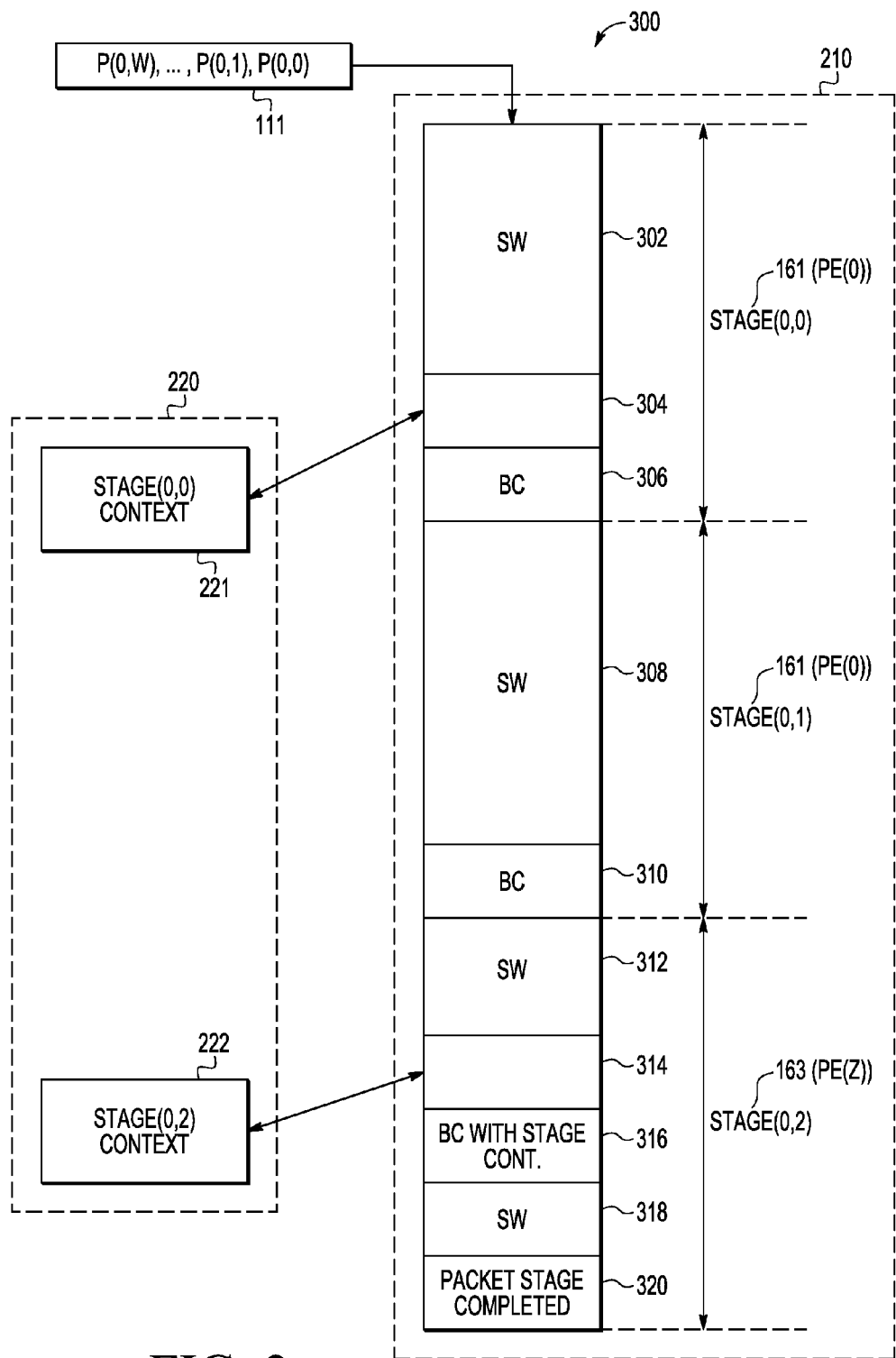
FIG. 3 illustrates a pipelined data stream processing algorithm that processes packets of an ordered data stream, including a data stream pipeline, stream context data, software sub-algorithms, and barrier scheduling mechanisms in accordance with a least one embodiment of the present disclosure.

FIG. 3 illustrates a pipelined data stream processing algorithm 300 that processes packets of an ordered data stream. The pipelined data stream processing algorithm 300 includes a data stream pipeline 210, stream context data 220, software sub-algorithms, and barrier scheduling mechanisms in accordance with a least one embodiment of the present disclosure. The data stream pipeline 210 includes multiple pipelined data stream processing stages Stage(0,0), Stage(0,1), and Stage(0, 2), wherein each stage implements a portion (sub-algorithm) of the pipelined data stream processing algorithm 300 for ordered data stream 111 on its corresponding processing element 161, PE(0), and 163, PE(Z). In this embodiment, the stream context data 220 is shown to include multiple stage context data areas Stage(0,0) Context, and Stage(0,2) Context.

At the start of the first-in-order Stage(0,0) of the data stream pipeline 210, the processing element 161, PE(0), a general purpose instruction-based processor in this example embodiment, executes the Stage(0,0) software sub-algorithm 302 of the pipelined data stream processing algorithm to process packet P(0,0). Stage(0,0) then performs conflict section processing 304 of packet P(0,0), where conflict section processing, processing of a task conflict section portion, includes accesses and updates to the Stage(0,0) Context data 221 of the stream context data 220. The Stage(0,0) processing of packet P(0,0) completes by sending a barrier clear indicator 306 for Stage(0,0) and packet P(0,0) from the processing element 161 to the hardware scheduler 150 indicating that Stage(0,0) processing of packet P(0,0) is complete, that Stage (0,0) is available to process the next-in-order packet, and that packet P(0,0) is ready to proceed to the next-in-order stage. The barrier clear indicator 306 may be sent to the hardware scheduler 150 implicitly when Stage(0,0) performs a task switch at the completion of processing or may be sent explicitly by Stage(0,0) at the end of processing of the task portion. The barrier clear indicator 306 may be a signal that the processing element 161 asserts by executing a dedicated instruction, or the barrier clear indicator 306 may be stored at a pre-defined storage location that the processing element 161 updates by writing to the pre-defined storage location, or the barrier clear indicator 306 may be stored at a register that the processing element 161 updates by writing to the register. The processing element 161 may also send the barrier clear indicator 306 to the hardware scheduler 150 via the corresponding interconnect 164-166 (FIG. 1).

Referring back to FIG. 1, as processing continues at time T4, the hardware scheduler 150 receives a barrier clear indicator 306 for Stage(0,0) and packet P(0,0) (FIG. 3 Stage(0,0)) from the processing element 161 indicating that the processing of packet P(0,0) has completed, or no longer blocks other processing, and thus Stage(0,0) is available for processing a next-in-order packet. Note that for purposes of description it is presumed that stage processing is complete when the barrier clear indicator is sent.

In response to receiving the barrier clear indicator 306, the hardware scheduler 150 sets the Stage Barrier Indicator value for Stage(0,0) to Available, will determine that Stage(0,0) is not the last-in-order stage of the data stream pipeline 210, will determine that Stage(0,1) is the next-in-order stage of the data stream pipeline 210 to process packet P(0,0), and determines if the next-in-order Stage(0,1) is available to process packet P(0,0). In the present example, as indicated at Table 6 (the last time the Stream Workflow Table for Stream(0) was updated until now), Stage(0,1) is available and the Stage Barrier Indicator is set to Blocked to prevent other packets from being processed by Stage(0,1), and processing of packet P(0,0) begins, as indicated by the indicator P(0,0) in the Current Packet column of Table 8.

TABLE 8

Stream Workflow Table for Stream(0)
Time T4

| Stream Stage ID | PTR to Workflow | Current Packet | Stage Barrier Indicator | Blocked Queue PTR (Status) |
| --- | --- | --- | --- | --- |
| Stage(0,0) | ADDR_WF(0,0) | — | Available | ADDR_P(0,1) |
| Stage(0,1) | ADDR_WF(0,1) | P(0,0) | Blocked | (Empty) |
| Stage(0,2) | ADDR_WF(0,2) | — | Available | (Empty) |

Furthermore, in response to the Stage Barrier Indicator value of Stage(0,0) being set to Available, the hardware scheduler 150 will determine that there is a next-in-order packet P(0,1) waiting for Stage(0,0) to become available, as indicated at Table 8, will set the Stage Barrier Indicator to Blocked to prevent other packets from being processed by Stage(0,0) and will allow the processing element 161 implementing Stage(0,0) to begin processing the next-in-order packet, as indicated by the indicator P(0,1) in the Current Packet column of Table 9. This results in the packet P(0,1) being removed from the Stream(0) Blocked Queue, and the indicator at the Blocked Queue PTR column to be removed, indicating no other packet of Stream(0) is pending. The hardware scheduler 150 then waits for a next-in-order packet to become available.

TABLE 9

Stream Workflow Table for Stream(0)
Time T4

| Stream Stage ID | PTR to Workflow | Current Packet | Stage Barrier Indicator | Blocked Queue PTR (Status) |
| --- | --- | --- | --- | --- |
| Stage(0,0) | ADDR_WF(0,0) | P(0,1) | Blocked | (Empty) |
| Stage(0,1) | ADDR_WF(0,1) | P(0,0) | Blocked | (Empty) |
| Stage(0,2) | ADDR_WF(0,2) | — | Available | (Empty) |

The Stage(0,1) processing of packet P(0,0) that began at time T4 is described in further detail with reference to FIG. 3 Stage(0,1).

The second next-in-order Stage(0,1) processing of packet P(0,0), illustrated in FIG. 3, is similar to the first-in-order Stage(0,0) processing described earlier, except that Stage(0, 1) has no Stage Context data, so there is no conflict section processing of packet P(0,0). The processing element 161, PE(0), a general purpose instruction-based processor, executes the Stage(0,1) software sub-algorithm 308 to process packet P(0,0). Stage(0,1) completes by sending a barrier clear indicator 310 for Stage(0,1) and packet P(0,0) to the hardware scheduler 150 indicating that Stage(0,1) has completed and is available to process the next-in-order packet, and that packet P(0,0) is ready to proceed to the next-in-order stage.

Referring back to FIG. 1, at time T5, the hardware scheduler 150 receives a barrier clear indicator 310 for Stage(0,1) and packet P(0,0) (FIG. 3 Stage(0,1)) from the processing element 161 that indicates the processing of packet P(0, 0) has completed, or no longer blocks other processing, and thus Stage(0,1) is available for processing a next-in-order packet.

In response to receiving the barrier clear indicator 310, the hardware scheduler 150 sets the Stage Barrier Indicator value for Stage(0,1) to Available, and will determine that Stage(0,1) is not the last-in-order stage of the data stream pipeline 210. In a similar manner as previously described, and illustrated at Table 10, the hardware scheduler 150 marks Stage(0,2) as blocked with respect to further processing packets of Stream (0) and schedules processing of packet P(0,0) by Stage(0,2). The hardware scheduler 150 then waits for a next-in-order packet to become available.

TABLE 10

Stream Workflow Table for Stream(0)
Time T5

| Stream Stage ID | PTR to Workflow | Current Packet | Stage Barrier Indicator | Blocked Queue PTR (Status) |
|---|---|---|---|---|
| Stage(0,0) | ADDR_WF(0,0) | P(0,1) | Blocked | (Empty) |
| Stage(0,1) | ADDR_WF(0,1) | — | Available | (Empty) |
| Stage(0,2) | ADDR_WF(0,2) | P(0,0) | Blocked | (Empty) |

The Stage(0,2) processing of packet P(0,0) is described in detail with reference to FIG. 3 Stage(0,2).

The third and last-in-order Stage(0,2) processing of packet P(0,0), illustrated in FIG. 3, differs from the previous stages, Stage(0,0) and Stage(0,1), by allowing for overlap processing of each subsequent next-in-order packet once the conflict section processing of the immediately preceding packet has completed. The processing element 163, PE(Z), a general purpose instruction-based processor, executes the Stage(0,2) software sub-algorithm 312 to process packet P(0,0). Stage (0,2) then performs conflict section processing 314, processing of a task conflict section portion, of packet P(0,0), where conflict section processing includes accesses and updates to the Stage(0,2) Context data 222 of the stream context data 220. At the end of the conflict section processing 314 of packet P(0,0), Stage(0,2) sends a barrier clear with stage continuation indicator 316 for Stage(0,2) and packet P(0,0) to the hardware scheduler 150 indicating that the Stage(0,2) conflict section processing 314 of packet P(0,0) has completed, that the remaining Stage(0,2) processing, processing of a task end portion, of packet P(0,0) continues, and that Stage(0,2) is available to process the next-in-order packet. The barrier clear with stage continuation indicator 316 is explicitly sent at the end of the conflict section processing 314, which may be implemented by the execution of a special instruction. Stage(0,2) continues execution of the Stage(0,2) software sub-algorithm 318 to process packet P(0,0).

Referring back to FIG. 1, at time T6, the hardware scheduler 150 receives a barrier clear with stage continuation indicator 316 for Stage(0,2) and packet P(0,0) (FIG. 3 Stage(0,2)) from the processing element 163 that indicates that the Stage (0,2) conflict section processing 314 of packet P(0,0) has completed, or no longer blocks other processing, that the remaining Stage(0,2) processing of packet P(0,0) continues, and that Stage(0,2) is available for processing a next-in-order packet that may overlap processing of packet P(0,0).

In response to receiving the barrier clear with stage continuation indicator 316 for Stage(0,2) and packet P(0,0), the hardware scheduler 150 sets the Stage Barrier Indicator value for Stage(0,2) to Available to identify Stage(0,2) as available to process the next-in-order packet, as illustrated at Table 11. The hardware scheduler 150 also adds packet P(0,0) to the tail of the stage continuation queue for Stage(0,2) with the packet status indicator value of "Continuation" (not illustrated) to identify current stage processing of packet P(0,0) as continuing, and to maintain each packet's status and data stream packet order in the stage continuation queue for Stage(0,2). The hardware scheduler 150 then waits for a next-in-order packet to become available.

TABLE 11

Stream Workflow Table for Stream(0)
Time T6

| Stream Stage ID | PTR to Workflow | Current Packet | Stage Barrier Indicator | Blocked Queue PTR (Status) |
|---|---|---|---|---|
| Stage(0,0) | ADDR_WF(0,0) | P(0,1) | Blocked | (Empty) |
| Stage(0,1) | ADDR_WF(0,1) | — | Available | (Empty) |
| Stage(0,2) | ADDR_WF(0,2) | P(0,0) | Available | (Empty) |

Referring back to FIG. 3, the Stage(0,2) software sub-algorithm 318 processing of packet P(0,0) completes and Stage(0,2) sends a packet stage completed indicator 320, also referred herein as a ready to proceed to next task portion indicator, for Stage(0,2) and packet P(0,0) from processing element 163 to the hardware scheduler 150 indicating that Stage(0,2) processing of packet P(0,0) has completed, and that packet P(0,0) is ready to proceed to the next-in-order stage. The packet stage completed indicator 320 may be explicitly sent at the end of the Stage(0,2) software sub-algorithm 318, which may be implemented by the execution of another special instruction.

Referring back to FIG. 1, at time T7, the hardware scheduler 150 receives the packet stage completed indicator 320 for Stage(0,2) and packet P(0,0) (FIG. 3 Stage(0,2)) from the processing element 163 that indicates that Stage(0,2) processing of packet P(0,0) has completed, and that packet P(0,0) is ready to proceed to the next-in-order stage.

In response to receiving the packet stage completed indicator 320, the hardware scheduler 150 clears the Current Packet value for Stage(0,2) to identify that packet P(0,0) no longer occupies Stage(0,2), as illustrated at Table 12, and sets the packet status indicator value to "Completed" in the packet P(0,0) entry in the stage continuation queue for Stage(0,2) to indicate that stage processing of packet P(0,0) has completed (not illustrated).

TABLE 12

Stream Workflow Table for Stream(0)
Time T7

| Stream Stage ID | PTR to Workflow | Current Packet | Stage Barrier Indicator | Blocked Queue PTR (Status) |
|---|---|---|---|---|
| Stage(0,0) | ADDR_WF(0,0) | P(0,1) | Blocked | (Empty) |
| Stage(0,1) | ADDR_WF(0,1) | — | Available | (Empty) |
| Stage(0,2) | ADDR_WF(0,2) | — | Available | (Empty) |

In response to setting the packet status indicator value to "Completed", the hardware scheduler 150 determines that Stage(0,2) is the last-in-order stage of the data stream pipeline, and de-queues and moves each next-in-order packet with the packet status indicator value of Completed in the stage continuation queue for Stage(0,2) to the corresponding output packet data stream queue 191. By moving only next-in-order packets that reach the head of the stage continuation queue with the packet status indicator value of Completed, where no next-in-order packets are de-queued and moved out-of-order if the next-in-order packet at the head of the stage continuation queue does not have the packet status indicator value of Completed, for example, the packet status indicator value has the value of Continuation, data stream packet order is maintained in the output packet data stream queue 191, and possible race conditions that may occur due to overlap processing of packets are avoided. The hardware scheduler 150 then waits for a next-in-order packet to become available.

In another example embodiment, the stage that just completed processing of packet P(0,0) is not the last-in-order stage of the data stream pipeline. In this other example, the hardware scheduler 150 determines that the stage that just completed processing of packet P(0,0) is not the last-in-order stage of the data stream pipeline. In response, the hardware scheduler 150 de-queues and makes each next-in-order packet with the packet status indicator value of Completed in the stage continuation queue available for next-in-order stage processing. Similar to the last-in-order stage processing described above, each completed next-in-order packet at the head of the stage continuation queue is de-queued and made available for next-in-order stage processing in data stream packet order while avoiding possible race conditions. The hardware scheduler 150 then waits for a next-in-order packet to become available.

Processing of packets of an ordered data stream in this manner allows for overlap processing of packets while maintaining conflict section atomicity of accesses and updates to Stage Context data 221-222 of the Stream Context data 220, and maintaining data stream packet ordering.

As described above with reference to FIG. 1, next-in-order packets are made available to the hardware scheduler 150 for pipelined data stream processing in parallel to the hardware scheduler 150 operation. The hardware scheduler 150, within processor 120, ensures, through the use of scheduling Stage Barrier Indicators, for example, as indicated by the Blocked indicator, that the next-in-order packets subsequent to the current packets being processed by the available appropriate processing elements 160 are prevented from entering the occupied stages until barrier clear indicators are received by the hardware scheduler 150 from the corresponding processing elements. Thus, packets of ordered data streams are processed in data stream packet order and in stage order. The use of Stage Barrier Indicators by the hardware scheduler 150 and barrier clear and barrier clear with stage continuation indicators by each stage also ensures that accesses and updates to the Stage Context data segment of the ordered data stream's stream context data are done atomically. That is, the stage algorithm will not send a barrier clear or barrier clear with stage continuation indicator to the hardware scheduler 150 to unblock a stage until the stage context data is no longer needed.

In another example embodiment, a particular stage of the data stream pipeline does not have any conflict section processing and does not require packets to be processed in data stream packet order in the particular stage. Thus, the particular stage allows for fully overlapped parallel processing of next-in-order packets since it is always available, for example, the Stage Barrier Indicator maintained by the hardware scheduler 150 always has the value of Available. In order to ensure that each next-in-order packet that enters the particular stage is processed in data stream packet order in subsequent next-in-order stages of the data stream pipeline, the hardware scheduler 150 maintains a stage continuation queue for the particular stage in data stream packet order.

When a next-in-order packet becomes available the hardware scheduler 150, in a similar manner as previously described, adds the next-in-order packet with the packet status indicator value of "Continuation" to the tail of the stage continuation queue for the particular stage, and schedules processing of the next-in-order packet by the particular stage. The hardware scheduler 150 then waits for a next-in-order packet to become available.

The processing element, a general purpose instruction-based processor in this example embodiment, executes the particular stage software sub-algorithm to process the next-in-order packet. Upon completion of the software sub-algorithm, the particular stage sends a packet stage completed indicator for the particular stage and the next-in-order packet from the processing element to the hardware scheduler 150 indicating that the particular stage processing of the next-in-order packet has completed, and that the next-in-order packet is ready to proceed to the next-in-order stage.

The hardware scheduler 150 receives the packet stage completed indicator for the particular stage and the next-in-order packet from the processing element.

In response to receiving the packet stage completed indicator, the hardware scheduler 150 in a similar manner as previously described, sets the packet status indicator value to "Completed" in the next-in-order packet entry in the stage continuation queue for the particular stage to indicate that the particular stage processing of the next-in-order packet has completed. In response to setting the packet status indicator value to "Completed", the hardware scheduler 150 determines if the particular stage is the last-in-order stage of the data stream pipeline.

If the particular stage is the last-in-order stage of the data stream pipeline, the hardware scheduler 150 de-queues and moves each next-in-order packet with the packet status indicator value of Completed in the stage continuation queue for the particular stage to the corresponding output packet data stream queue. By processing next-in-order packets in this manner, data stream packet order is maintained in the output packet data stream queue, and possible race conditions that may occur due to overlap processing of next-in-order packets are avoided. The hardware scheduler 150 then waits for a next-in-order packet to become available.

If the particular stage is not the last-in-order stage of the data stream pipeline, the hardware scheduler 150 de-queues and makes each next-in-order packet with the packet status indicator value of Completed in the stage continuation queue available for next-in-order stage processing. In this manner, next-in-order packets are processed in data stream packet order by the subsequent next-in-order stage while avoiding possible race conditions. The hardware scheduler 150 then waits for a next-in-order packet to become available.

In another embodiment, the hardware scheduler 150 may, as part of maintaining the stream context table 155, for example Table 1 as described above, determine for each one of the currently active ordered data streams if the last packet received time associated with the specific ordered data stream has exceeded its inactivity threshold time. If the inactivity threshold time has been exceeded, the hardware scheduler 150 may de-allocate and free up the data stream resources that are associated with the specific ordered data stream to make the data stream resources available for other ordered data streams.

In another embodiment, the hardware scheduler 150 may allocate and maintain a system wide Ready Queue. The Ready Queue contains the set of all schedulable packets of the active ordered data streams by priority, which includes all of the packets that the hardware scheduler 150 has determined that the next-in-order stages are available to process the packets, as previously described. Packets of many different active ordered data streams may be on the Ready Queue. When the hardware scheduler 150 determines that the next-in-order stage is available to process the packet, the hardware scheduler 150 adds the packet to the Ready Queue along with the packet's priority information. The hardware scheduler 150 selects the highest priority packet from the set of all schedulable packets on the Ready Queue to schedule processing on an available appropriate processing element. The hardware scheduler 150 may determine the highest priority packet based on the age of each one of the packets, for example, the amount of time that each packet has been on the Ready Queue, where the packet that has been on the Ready Queue for the longest time becomes the highest priority packet. The highest priority packet may be determined based on the class of service for the specific ordered data stream that the packet belongs to, and the like, and combinations thereof. Once the hardware scheduler 150 determines and selects the highest priority packet on the Ready Queue, the hardware scheduler 150, as previously described above, de-queues the packet from the ready queue; sets the Stage Barrier Indicator value to the Blocked indicator; sets the Current Packet to the selected packet; and enables the available appropriate processing element to process the selected packet. The Ready Queue allows the hardware scheduler 150 to schedule all of the available hardware resources required to process the packets of the plurality of active ordered data streams, such that the throughput of the pipelined scheduler stream processing system 100 is maximized.

In another embodiment, the pipelined scheduler stream processing system 100 may not receive all of the packets in its ordered data stream due to, for example, alternate routing paths, such that the packets' sequence numbers in the packets' packet headers 115 are not consecutive sequence numbers. The packets that are received by the pipelined scheduler stream processing system 100 are still processed in the order in which they are received, data stream packet order, as described above.

In another embodiment, the pipelined scheduler stream processing system 100 may provide a hardware mechanism that provides for access and update permissions for each Stage Context data segment of the data stream's stream context data to, for example, only allow accesses and updates to a specific Stage Context data segment by its corresponding stage, where other stages not associated with the specific Stage Context data segment are prevented from accessing and updating this data.

Figure 4:
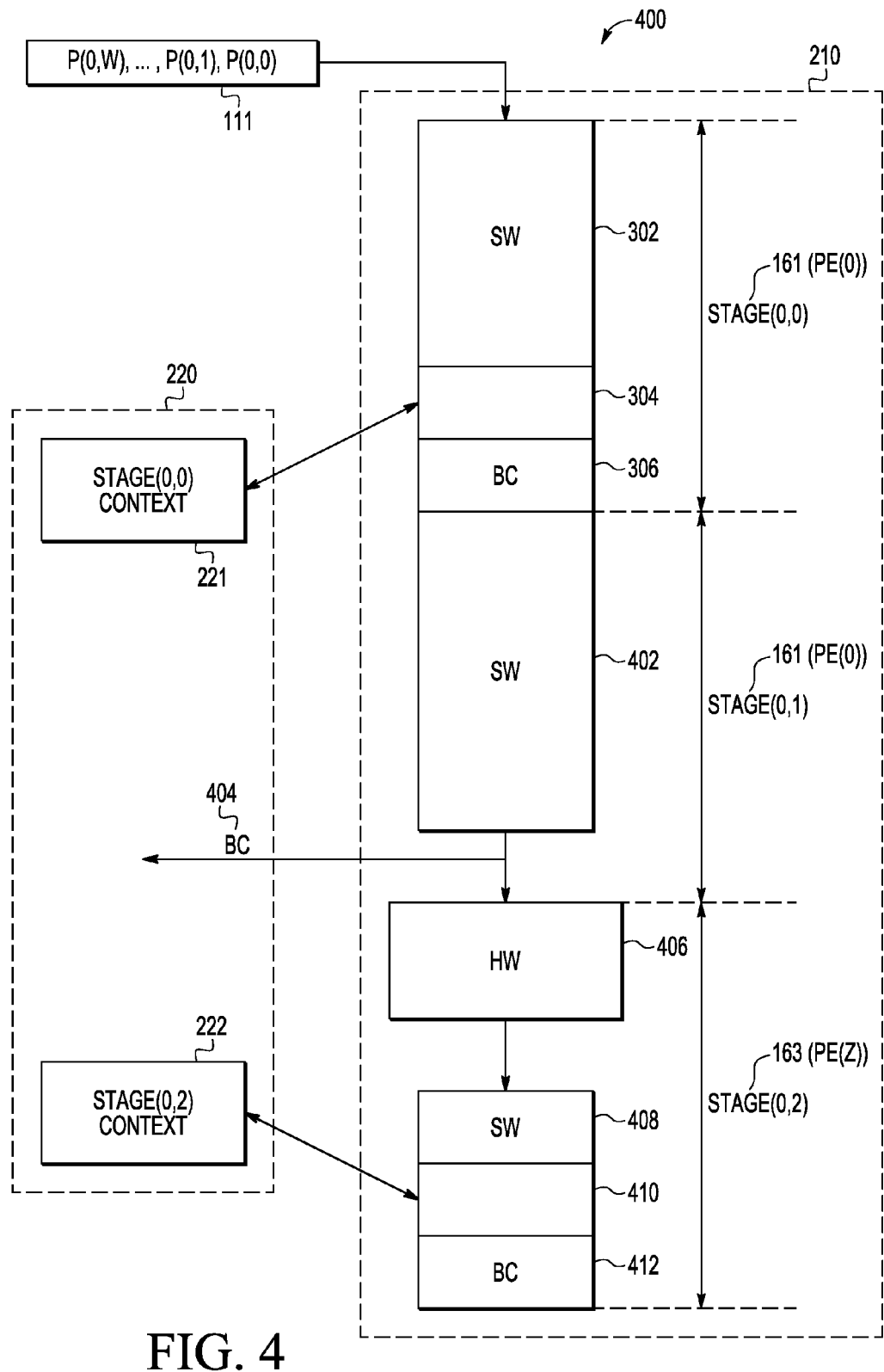
FIG. 4 illustrates a pipelined data stream processing algorithm that processes packets of an ordered data stream, including a data stream pipeline, stream context data, software and hardware sub-algorithms, and barrier scheduling mechanisms in accordance with a least one embodiment of the present disclosure.

FIG. 4 illustrates a pipelined data stream processing algorithm 400 that processes packets of an ordered data stream. The pipelined data stream processing algorithm 400 includes a data stream pipeline 210, stream context data 220, software and hardware sub-algorithms, and barrier scheduling mechanisms in accordance with a least one embodiment of the present disclosure. The pipelined data stream processing algorithm 400 is similar to the pipelined data stream processing algorithm 300 described earlier with respect to FIG. 3, except that one of the processing elements includes a specific purpose processing device to execute a stage hardware sub-algorithm to process packets.

The transition to and the execution of the first-in-order Stage(0,0) illustrated in FIG. 4 is the same as the first-in-order Stage(0,0) previously described with respect to FIG. 3 and will not be repeated for FIG. 4.

In a similar manner as previously described (FIG. 1 and FIG. 3 Stage(0,1)), the hardware scheduler 150 receives a barrier clear indicator 306 for Stage(0,0) and packet P(0,0) and in response, the hardware scheduler 150 marks Stage(0, 0) as Available, will determine that Stage(0,0) is not the last-in-order stage of the data stream pipeline 210 and that Stage(0,1) is the next-in-order stage to process packet(0,0). The hardware scheduler 150 marks Stage(0,1) as blocked with respect to further processing packets of ordered data stream 111 and schedules processing of packet P(0,0) by Stage(0,1). The hardware scheduler 150 then waits for a next-in-order packet to become available.

The second next-in-order Stage(0,1) processing of packet P(0,0) is similar to the second next-in-order Stage(0,1) processing of packet P(0,0) described earlier with respect to FIG. 3, except that the Stage(0,1) software sub-algorithm 402 to process packet P(0,0) ends by requesting a hardware offload to a specific purpose processing device. Stage(0,1) completes by sending a barrier clear indicator 404 for Stage(0,1) and packet P(0,0) from the processing element 161 to the hardware scheduler 150 indicating that Stage(0,1) processing of packet P(0,0) is complete, that Stage(0,1) is available to process the next-in-order packet, and that packet P(0,0) is ready to proceed to the next-in-order stage. The barrier clear indicator 404 may be sent to the hardware scheduler 150 implicitly in response to the hardware offload request or may be sent explicitly by Stage(0,1) at the end of processing of the task portion, which may be implemented by the execution of a special instruction.

The hardware scheduler 150 receives the barrier clear indicator 404 for Stage(0,1) and packet P(0,0) from the processing element 161 indicating that the processing of packet P(0, 0) has completed, or no longer blocks other processing, and that Stage(0,1) is available for processing a next-in-order packet. The hardware scheduler 150, in response to receiving the barrier clear indicator 404, sets the Stage Barrier Indicator value for Stage(0,1) to Available, will determine that Stage (0,1) is not the last-in-order stage of the data stream pipeline 210, and will determine that Stage(0,2) is the next-in-order stage to process packet P(0,0). In a similar manner as described above, with reference to FIG. 1 and FIG. 3 Stage (0,2), the hardware scheduler 150 will determine that Stage (0,2) is Available, marks Stage(0,2) as Blocked with respect to further processing packets of ordered data stream 111 and schedules processing of packet P(0,0) by Stage(0,2). The hardware scheduler 150 then waits for a next-in-order packet to become available.

The third and last-in-order Stage(0,2) processing of packet P(0,0) differs from the previous stages, Stage(0,0) and Stage (0,1), by executing a portion of the Stage(0,2) processing of packet P(0,0) on a specific purpose processing device. The processing element 163, PE(Z), a specific purpose processing device, which may be a specific purpose hardware device, for example, a security device, an encryption device, a decryption device, a statistics device, and the like, executes the Stage(0,2) hardware sub-algorithm 406 to process packet P(0,0). Upon completion of the hardware sub-algorithm 406, control is passed to another processing element, a general purpose instruction-based processor in this example, previously allocated to Stage(0,2) by the hardware scheduler 150, to execute the Stage(0,2) software sub-algorithm 408 to process packet P(0,0). Upon completion of the software sub-algorithm 408, Stage(0,2) performs conflict section processing 410 of packet P(0,0), where conflict section processing includes accesses and updates to the Stage(0,2) Context data 222 of the stream context data 220. Stage(0,2) completes by sending a barrier clear indicator 412 for Stage(0,2) and packet P(0,0) to the hardware scheduler 150 indicating that Stage(0, 2) processing of packet P(0,0) has completed, that packet P(0,0) is ready to proceed to the next-in-order stage, and that Stage(0,2) is available to process the next-in-order packet. The barrier clear indicator 412 may be sent to the hardware scheduler 150 implicitly when Stage(0,2) performs a task context switch at the completion of processing or may be sent explicitly by Stage(0,2) at the end of processing of the task portion, which may be implemented by the execution of a special instruction.

The hardware scheduler 150 receives a barrier clear indicator 412 for Stage(0,2) and packet P(0,0) from the processing element 163 that indicates the processing of packet P(0,0) has completed, or no longer blocks processing, that packet P(0,0) is ready to proceed to the next-in-order stage, and that Stage(0,2) is available to process the next-in-order packet.

In response to receiving the barrier clear indicator 412, the hardware scheduler 150 sets the Stage Barrier Indicator value for Stage(0,2) to Available, will determine that Stage(0,2) is the last-in-order stage of the data stream pipeline 210, and will add packet P(0,0) to the tail of the corresponding output packet data stream queue 191. The hardware scheduler 150 then waits for a next-in-order packet to become available.

Figure 5:
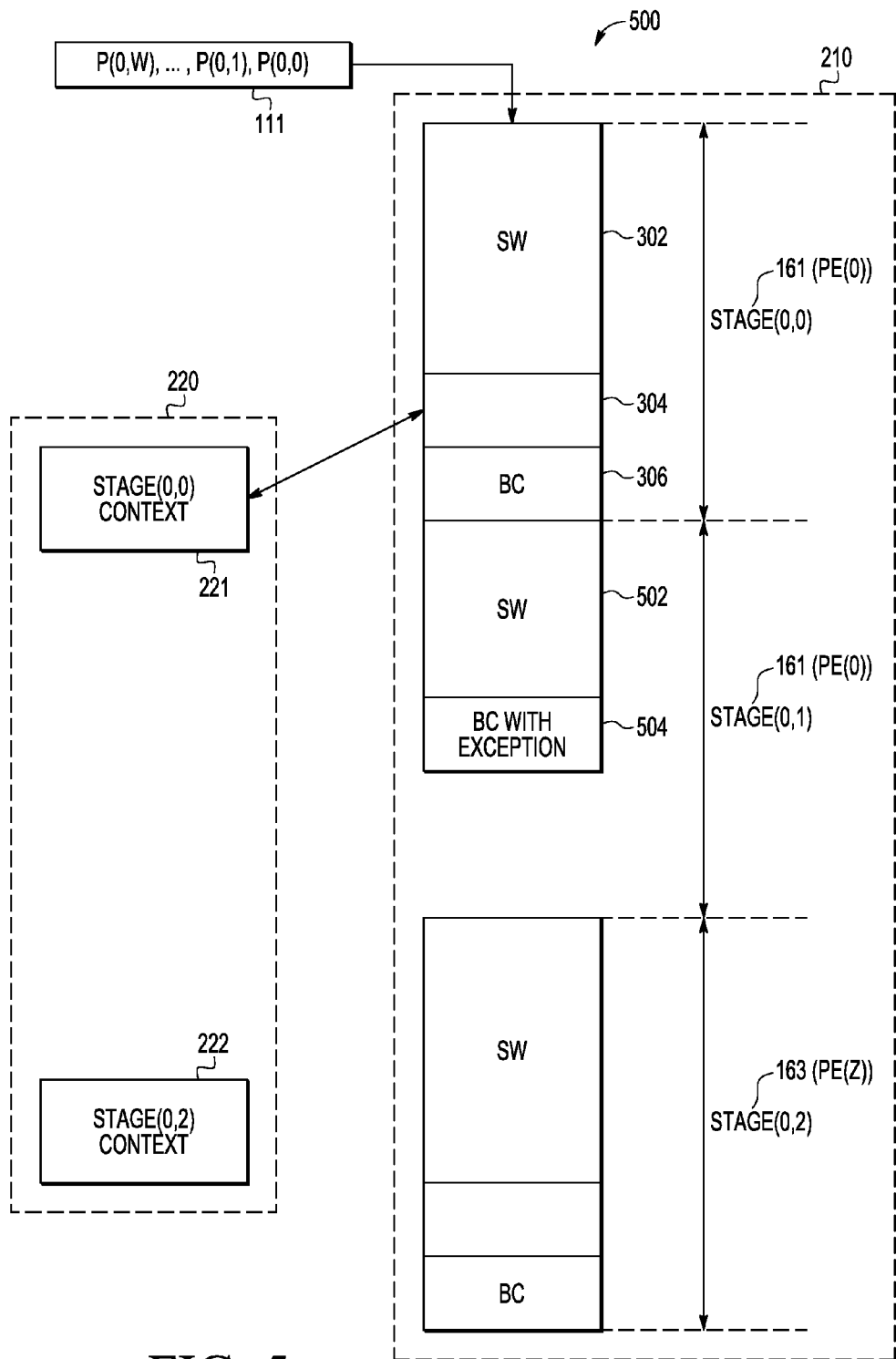
FIG. 5 illustrates a pipelined data stream processing algorithm that processes packets of an ordered data stream, including a data stream pipeline, stream context data, software sub-algorithms, and barrier scheduling and exception handling mechanisms in accordance with a least one embodiment of the present disclosure.

FIG. 5 illustrates a pipelined data stream processing algorithm 500 that processes packets of an ordered data stream. The pipelined data stream processing algorithm 500 includes a data stream pipeline 210, stream context data 220, software sub-algorithms, and barrier scheduling and exception handling mechanisms in accordance with a least one embodiment of the present disclosure. The pipelined data stream processing algorithm 500 is similar to the pipelined data stream processing algorithm 300 described earlier with respect to FIG. 3, except that pipelined data stream processing ends prematurely due to the occurrence of an exception.

The transition to and the execution of the first-in-order Stage(0,0) illustrated in FIG. 5 is the same as the first-in-order Stage(0,0) previously described with respect to FIG. 1 and FIG. 3 Stage(0,0) and will not be repeated for FIG. 5.

In a similar manner as previously described (FIG. 1 and FIG. 3 Stage(0,1)), the hardware scheduler 150 receives a barrier clear indicator 306 for Stage(0,0) and packet P(0,0) and in response, the hardware scheduler 150 marks Stage(0,0) as Available, will determine that Stage(0,0) is not the last-in-order stage of the data stream pipeline 210, and will determine that Stage(0,1) is the next-in-order stage to process packet P(0,0). The hardware scheduler 150 marks Stage(0,1) as blocked with respect to further processing packets of ordered data stream 111 and schedules processing of packet P(0,0) by Stage(0,1). The hardware scheduler 150 then waits for a next-in-order packet to become available.

The second next-in-order Stage(0,1) processing of packet P(0,0) is similar to the second next-in-order Stage(0,1) processing of packet P(0,0) described earlier with respect to FIG. 1 and FIG. 3 Stage(0,1), except that during execution of the Stage(0,1) software sub-algorithm 502 to process packet P(0,0) an exception condition occurs, which may be, for example, an error, a timeout, other control logic causes the exception, and the like. Stage(0,1) ends processing of packet P(0,0) prematurely and sends a barrier clear with exception indicator 504 from the processing element 161 to the hardware scheduler 150, indicating that an exception occurred during Stage (0,1) processing of packet P(0,0), and that Stage(0,1) is available to process the next-in-order packet. The barrier clear with exception indicator 504 may be sent to the hardware scheduler 150 explicitly by exception handling code that was invoked when the exception occurred, which may be implemented by a special instruction.

The hardware scheduler 150 receives the barrier clear with exception indicator 504 for Stage(0,1) and packet P(0,0) from the processing element 161 indicating that an exception occurred during Stage(0,1) processing of packet P(0,0), and that Stage(0,1) is available to process the next-in-order packet.

The hardware scheduler 150, in response to receiving the barrier clear with exception indicator 504, sets the Stage Barrier Indicator value for Stage(0,1) to Available. In response to the exception, the hardware scheduler 150 exits packet P(0,0) from the data stream pipeline 210 at Stage(0,1) and will not schedule any further processing of packet P(0,0). It will be appreciated that hardware scheduler 150 can vary how it handles the exception, for example, the exception may be handled by higher level software intervention. For purposes of discussion, it will be assumed that the hardware scheduler 150 responds to the exception by exiting the packet from the data stream pipeline at the stage the exception occurred and will not schedule any further processing of the packet. The hardware scheduler 150 then waits for a next-in-order packet to become available.

Figure 6:
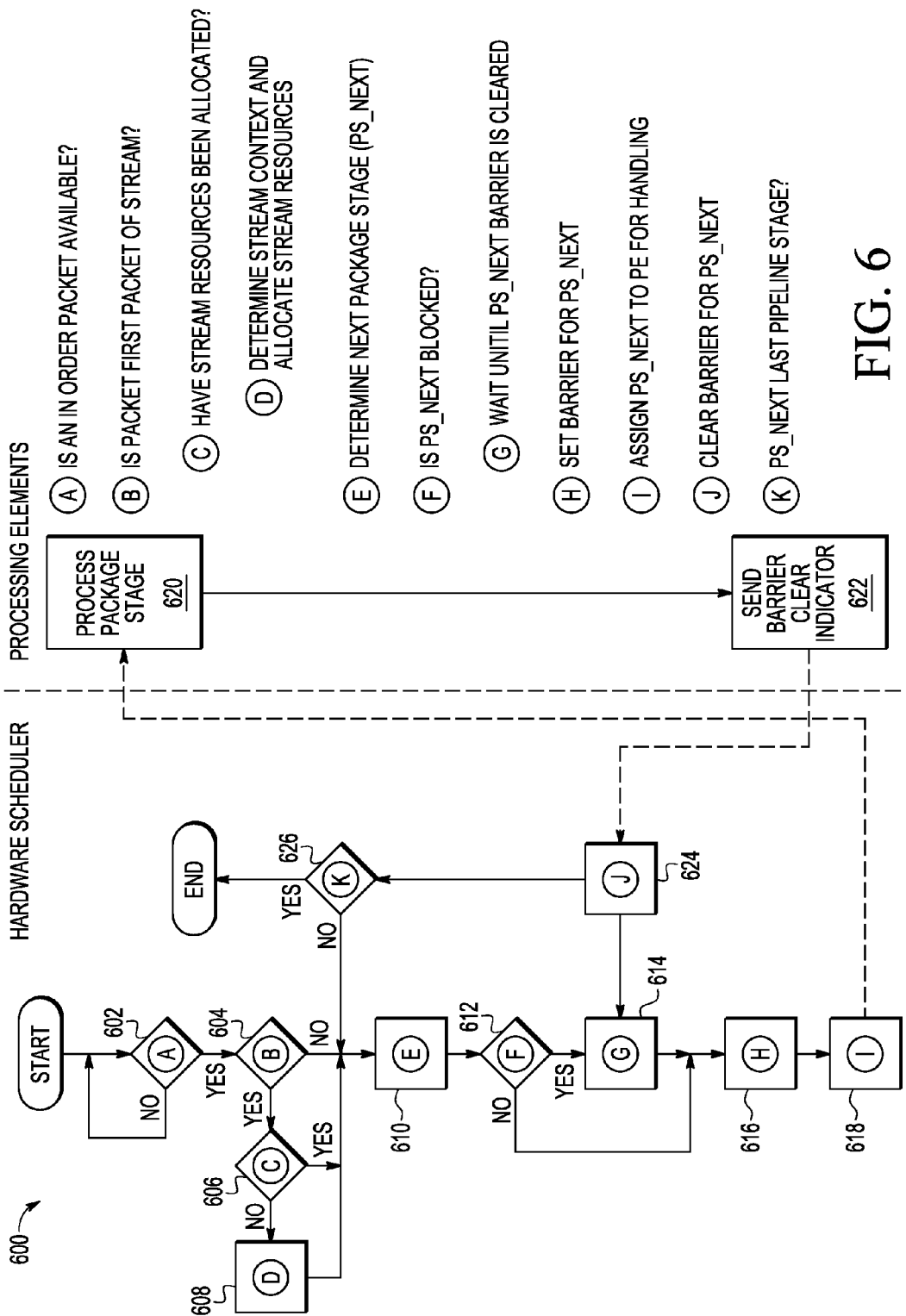
FIG. 6 illustrates a method for pipelined data stream processing of packets with barrier scheduling between the communication network and the processor of FIG. 1 in accordance with at least one embodiment of the present disclosure.

FIG. 6 illustrates a method for pipelined data stream processing of packets with barrier scheduling 600 between the communication network and the processor of FIG. 1 in accordance with at least one embodiment of the present disclosure. As previously described with reference to FIG. 1, when the processor 120 receives packets 114 of each of a plurality of ordered data streams, the processor 120 may perform packet classification to determine which specific ordered data stream each packet 114 belongs to, and each packet's Stream ID and sequence number, as previously described with respect to FIG. 1. The processor 120 may add each packet 114 to an appropriate input packet data stream queue in data stream packet order based on each packet's Stream ID, where packets having the same Stream ID belong to the same ordered data stream and are associated with the same input packet data stream queue. As described earlier with respect to FIG. 1, the processor 120 also updates a last packet received time associated with the packet's Stream ID, with the current time, indicating that the last packet received time is the time that packet 114 was just added to its input packet data stream queue.

The exemplary method 600 begins at block 602, where the hardware scheduler 150 of the processor 120 determines if a next-in-order packet of an ordered data stream is available for processing. A next-in-order packet is available if the corresponding input packet data stream queue contains at least one packet. If a next-in-order packet is not available, the hardware scheduler 150 proceeds back to block 602 to wait for a next-in-order packet to become available and proceeds as described above. If a next-in-order packet of an ordered data stream is available, the hardware scheduler 150 de-queues the next-in-order packet from its corresponding input packet data stream queue and proceeds to block 604.

At block 604, the hardware scheduler 150 determines if the next-in-order packet is the first-in-order packet of its ordered data stream. If the next-in-order packet is the first-in-order packet of its corresponding ordered data stream, for example, the next-in-order packet's sequence number is 0, the sequence number has a value corresponding to a pre-defined starting sequence number for its order data stream, or this is the first packet of its ordered data stream that has been seen by the hardware scheduler 150, the method proceeds to block 606. If the next-in-order packet is not the first-in-order packet of its ordered data stream, for example, the next-in-order packet's sequence number is greater than 0, the method proceeds to block 610.

At block 606, the hardware scheduler 150 determines if the data stream resources for the first-in-order packet's ordered data stream have been allocated based on the first-in-order packet's Stream ID, where the first-in-order packet's Stream ID was determined as described above. If the data stream resources have been allocated, for example, the hardware scheduler 150 locates an entry in a Stream Context Table that contains a Stream ID that matches the first-in-order packet's Stream ID, where the Stream Context Table is global relative to the plurality of streams and is stored at a memory location maintained by the hardware scheduler 150, as previously described with reference to FIG. 1, the method proceeds to block 610. If the data stream resources have not been allocated, for example, there is no entry in the Stream Context Table that contains a matching Stream ID, the method proceeds to block 608.

At block 608, the hardware scheduler 150 determines the stream context from stream specific configuration information provided by processor 120 comprising information that defines for the first-in-order packet's ordered data stream, the Stream ID, an inactivity threshold time, stream specific context information, and stream specific workflow information, based on the type of the ordered data stream, where the stream specific configuration information may be stored at a location of memory. Alternatively, as described above with reference to FIG. 1, the stream specific configuration information can be provided to the hardware scheduler 150 by another processor dedicated to maintaining and providing this information. The hardware scheduler 150 allocates a portion of memory for an entry in the Stream Context Table and allocates another portion of memory for a Stream Workflow Table for the first-in-order packet's ordered data stream. The hardware scheduler 150 initializes the Stream Context Table entry and the Stream Workflow Table for the first-in-order packet's ordered data stream from its stream specific configuration information, as previously described in detail with respect to FIG. 1, the method proceeds to block 610.

At block 610, the hardware scheduler 150 determines the next-in-order stage (packet stage) of the data stream pipeline for the next-in-order packet. If the next-in-order packet became available from its corresponding input packet data stream queue, the next-in-order stage is the first-in-order stage of the data stream pipeline, the method proceeds to block 612. If the next-in-order packet became available after the current stage processing of the next-in-order packet completed, the next-in-order stage is the subsequent next-in-order stage following the current stage that just completed, the method proceeds to block 612.

At block 612, the hardware scheduler 150 determines if the next-in-order stage of the data stream pipeline is blocked. If the next-in-order stage is blocked, for example, the Stage Barrier Indicator value in the next-in-order stage entry in the Stream Workflow Table corresponding to the next-in-order packet's Stream ID has the Blocked indicator, where the Stage Barrier Indicator is maintained by the hardware scheduler 150, the method proceeds to block 614. If the next-in-order stage is not blocked and is available, for example, the Stage Barrier Indicator value has the Available indicator, the method proceeds to block 616. Note that the Stream Context Table entry for the next-in-order packet, the entry that contains the matching next-in-order packet's Stream ID, contains a pointer to the memory location of the Stream Workflow Table for the next-in-order packet's ordered data stream, as previously described with reference to FIG. 1.

At block 614, the hardware scheduler 150 adds the next-in-order packet to the tail of the Blocked Queue for the next-in-order stage thereby maintaining the Blocked Queue in data stream packet order, where the pointer to the memory location of the Blocked Queue is contained in the next-in-order stage entry in the Stream Workflow Table corresponding to the next-in-order packet's Stream ID. The hardware scheduler 150 prevents next-in-order stage processing of next-in-order packets by waiting until the Stage Barrier Indicator value in the next-in-order stage entry in the Stream Workflow Table corresponding to the next-in-order packet's Stream ID has the Available indicator before proceeding with the remainder of block 614. In addition to waiting for the next-in-order stage to become available, the method proceeds back to block 602 to wait for a next-in-order packet to become available. In response to the Stage Barrier Indicator value being set to the Available indicator (cleared), the remainder of block 614 proceeds, the hardware scheduler 150 de-queues the packet at the head of the Blocked Queue which becomes the next-in-order packet to be processed by the next-in-order stage, the method proceeds to block 616.

At block 616, the hardware scheduler 150 sets the Stage Barrier Indicator value in the next-in-order stage entry in the Stream Workflow Table corresponding to the next-in-order packet's Stream ID to the Blocked indicator to indicate that the next-in-order stage is blocked with respect to processing any additional packets of the next-in-order packet's ordered data stream, the method proceeds to block 618.

At block 618, the hardware scheduler 150 assigns one or more available and appropriate processing elements to the next-in-order stage of the data stream pipeline for handling the next-in-order packet. The hardware scheduler 150 enables the one or more assigned processing elements to execute the sub-algorithm for the next-in-order stage of the data stream pipeline to process the next-in-order packet. The hardware scheduler method proceeds back to block 602 to wait for a next-in-order packet to become available. The processing elements method proceeds to block 620. As previously described in detail with reference to FIG. 1 and Tables 1 and 2, the hardware scheduler 150 communicates the information that enables the one or more assigned processing elements via the corresponding interconnects coupling the hardware scheduler 150 to the processing elements. The hardware scheduler 150 and the processing elements are coupled to the memory where the next-in-order stage's stream context data, a set of instructions and/or commands, and the like, can be accessed. The hardware scheduler 150 determines the resources required to implement the next-in-order stage of the data stream pipeline including the specific type and number of processing elements and the sub-algorithm, such as a set of instructions and/or a list of commands, from the next-in-order stage's workflow information. The pointer to the memory location where the next-in-order stage's workflow information can be accessed is contained in the next-in-order stage entry in the Stream Workflow Table corresponding to the next-in-order packet's Stream ID. The pointer to the memory location where the next-in-order packet's ordered data stream context can be accessed is contained in the Stream Context Table entry for the next-in-order packet that contains the matching next-in-order packet's Stream ID.

At block 620, in response to being enabled by the hardware scheduler 150, the one or more enabled processing elements executes the sub-algorithm for the next-in-order stage of the data stream pipeline to process the next-in-order packet, and performs any conflict section processing of the next-in-order packet including accesses and updates to the next-in-order stage's corresponding stage segment of the stream context data, the method proceeds to block 622.

At block 622, one of the enabled processing elements communicates a barrier clear indicator to the hardware scheduler 150 indicating that the next-in-order stage processing of the next-in-order packet is complete, that the next-in-order stage is available to process the subsequent next-in-order packet, and that the next-in-order packet is ready to proceed to the next stage, the hardware scheduler method proceeds to block 624. The processing elements method proceeds back to block 620 to wait for being enabled by the hardware scheduler 150. As previously described in detail with reference to FIG.

1, the processing element may communicate the barrier clear indicator to hardware scheduler 150 via the corresponding interconnect.

At block 624, in response to the barrier clear indicator being communicated from one of the enabled processing elements to the hardware scheduler 150 indicating that the next-in-order stage processing of the next-in-order packet is complete, that the next-in-order stage is available to process the subsequent next-in-order packet, and that the next-in-order packet is ready to proceed to the next stage, the hardware scheduler 150 sets the Stage Barrier Indicator value in the next-in-order stage entry in the Stream Workflow Table corresponding to the next-in-order packet's Stream ID to the Available indicator to indicate that the next-in-order stage is available to process the subsequent next-in-order packet. In response to the next-in-order stage becoming available, the remainder of the method at block 614 proceeds. The method also proceeds to block 626.

At block 626, the hardware scheduler 150 determines if the next-in-order stage that just completed was the last-in-order stage of the data stream pipeline for the next-in-order packet. In the example embodiment, it is presumed that stages of each data stream pipeline have consecutively numbered stage numbers, where the first-in-order stage's stage number has the value of zero. If the next-in-order stage was the last-in-order stage, for example, the number of stages contained in the Stream Context Table entry for the next-in-order packet's Stream ID is the same as the next-in-order stage's stage number plus one, the method proceeds back to block 602 to wait for a next-in-order packet to become available. If the next-in-order stage was not the last-in-order stage, for example, the number of stages is greater than the next-in-order stage's stage number plus one, the method proceeds to block 610 and proceeds as previously described.

In another embodiment, the hardware scheduler 150 of method 600 may, as part of maintaining the Stream Context Table, as described above with reference to FIG. 1, determine for each one of the ordered data streams in the Stream Context Table if the last packet received time associated with each specific ordered data stream has exceeded its inactivity threshold time. The last packet received time associated with the specific ordered data stream was set to the time the last packet was added to its corresponding input packet data stream queue. If the inactivity threshold time has been exceeded, the hardware scheduler 150 may de-allocate and free up the data stream resources that are associated with the specific ordered data stream to make the data stream resources available for future ordered data streams.

Figure 7:
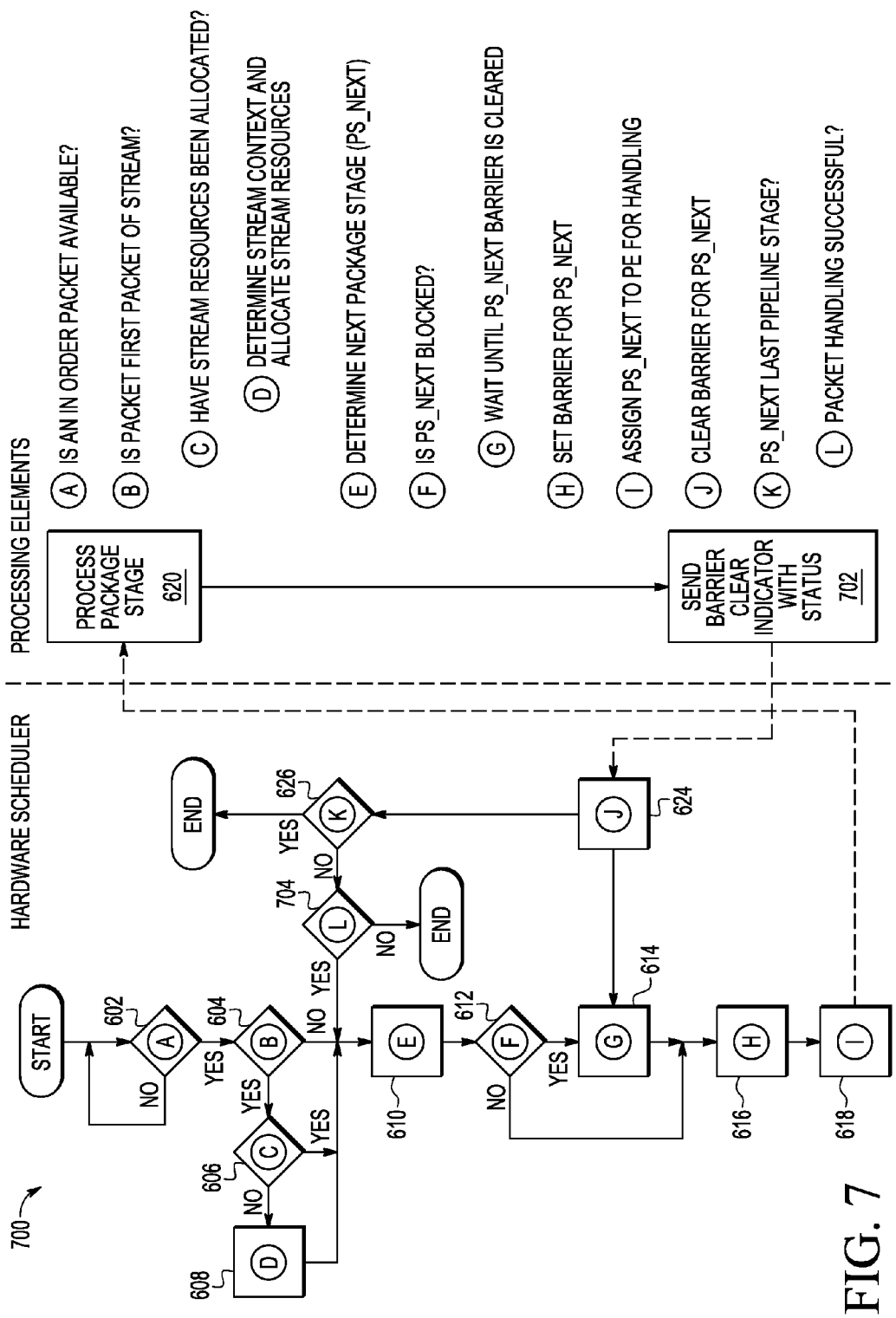
FIG. 7 illustrates a method for pipelined data stream processing of packets with barrier scheduling and exception handling between the communication network and the processor of FIG. 1 in accordance with at least one embodiment of the present disclosure.

FIG. 7 illustrates a method for pipelined data stream processing of packets with barrier scheduling and exception handling 700 between the communication network and the processor of FIG. 1 in accordance with at least one embodiment of the present disclosure. The exemplary method 700 is similar to the exemplary method 600 except that method 700 includes exception handling. The method 700 starting at block 602 and proceeding through block 620 is the same as method 600, previously described with reference to FIG. 6. The method 700 at block 624 and proceeding through block 626 is also the same as method 600, therefore the description of the method 700 blocks will not be repeated (reference FIG. 6.) The detailed description of method 700 will begin at the completion of block 620 where the method proceeds to block 702.

At the completion of block 620, the one or more enabled processing elements has completed execution of the sub-algorithm for the next-in-order stage of the data stream pipeline to process the next-in-order packet including accesses and updates to the corresponding stage segment of the stream context data, the flow proceeds to block 702.

At block 702, one of the enabled processing elements communicates a barrier clear indicator with status to the hardware scheduler 150 indicating that the next-in-order stage processing of the next-in-order packet has completed, that the next-in-order stage is available to process the subsequent next-in-order packet, and the status associated with the next-in-order stage processing of the next-in-order packet. If the next-in-order stage processing completed successfully, the status communicated is set to a successful indicator value. If an exception condition occurred during the next-in-order stage processing, which may be, for example, an error, a timeout, other control logic causes the exception, and the like, the status communicated is set to an exception indicator value that corresponds to the type of exception condition that occurred. The hardware scheduler method proceeds to block 624 through block 626 and the processing elements method proceeds back to block 620 to wait for being enabled by the hardware scheduler 150, which is the same as method 600 as previously described with reference to FIG. 6. At the completion of block 626, the hardware scheduler 150 has determined that the next-in-order stage is not the last-in-order stage, the method proceeds to block 704.

At block 704, the hardware scheduler 150 determines if the packet handling was successful. If the packet handling was successful, for example, the communicated status associated with the next-in-order stage processing of the next-in-order packet has the successful indicator value indicating that the next-in-order stage processing completed successfully, the method proceeds to block 610 and proceeds as previously described with reference to FIG. 6. If the packet handling was not successful, for example, the communicated status associated with the next-in-order stage processing of the next-in-order packet has an exception indicator value that corresponds to the type of the exception condition that occurred, the hardware scheduler 150 drops the next-in-order packet to end any further processing of it. The method proceeds back to block 602 to wait for a next-in-order packet to become available, as previously described with reference to FIG. 6.

Figure 8:
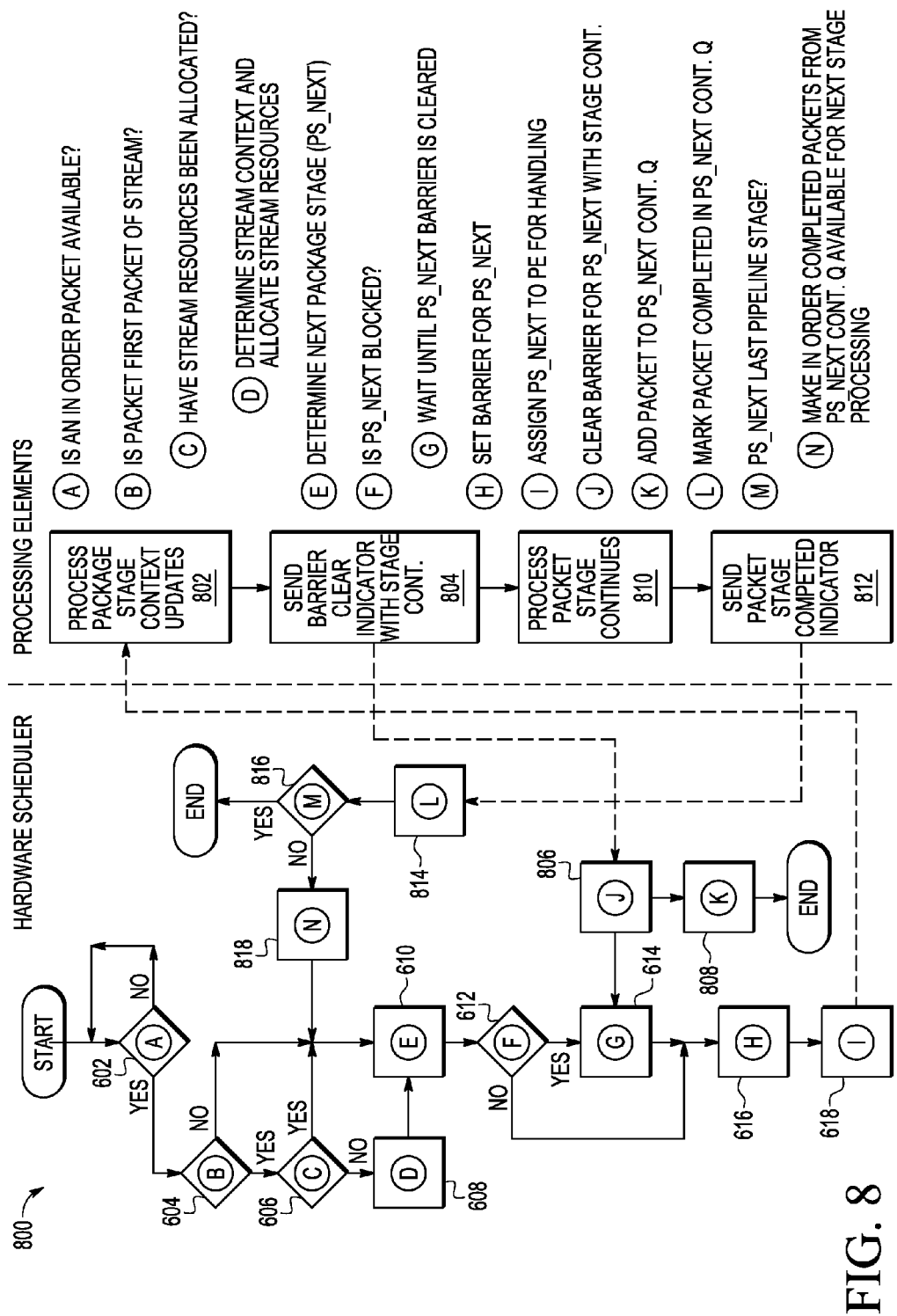
FIG. 8 illustrates a method for pipelined data stream processing of packets with barrier scheduling and overlap stage processing between the communication network and the processor of FIG. 1 in accordance with at least one embodiment of the present disclosure.

FIG. 8 illustrates a method for pipelined data stream processing of packets with barrier scheduling and overlap stage processing 800 between the communication network and the processor of FIG. 1 in accordance with at least one embodiment of the present disclosure. The exemplary method 800 is similar to the exemplary method 600 except that method 800 includes overlap stage processing of packets, where overlap stage processing allows next-in-order stage processing of a subsequent next-in-order packet to proceed once the next-in-order stage processing of the next-in-order packet completes conflict section processing. The method 800 starting at block 602 and proceeding through block 618 is the same as method 600, therefore the description of these method 800 blocks will not be repeated (reference FIG. 6.) The detailed description of method 800 will begin at the completion of block 618 where the method proceeds to block 802.

At the completion of block 618, the hardware scheduler 150 has enabled one or more processing elements to execute the sub-algorithm for the next-in-order stage of the data stream pipeline to process the next-in-order packet including completing any accesses and updates to the corresponding stage segment of the stream context data, the processing elements method proceeds to block 802 and the hardware scheduler method proceeds back to block 602 to wait for a next-in-order packet to become available, as previously described with reference to FIG. 6.

At block 802, in response to being enabled by the hardware scheduler 150, the one or more enabled processing elements executes the start of the sub-algorithm for the next-in-order stage of the data stream pipeline to process the next-in-order packet, and performs any conflict section processing of the next-in-order packet including accesses and updates to the next-in-order stage's corresponding stage segment of the stream context data. Upon completion of the conflict section processing, the method proceeds to block 804.

At block 804, one of the enabled processing elements communicates a barrier clear indicator with stage continuation to the hardware scheduler 150 indicating that the next-in-order stage conflict section processing of the next-in-order packet has completed, that the next-in-order stage processing of the next-in-order packet is continuing, and that the next-in-order stage is available to process the subsequent next-in-order packet, the hardware scheduler method proceeds to block 806 and the processing elements method proceeds to block 810.

At block 806, in response to the barrier clear with stage continuation indicator being communicated from one of the enabled processing elements to the hardware scheduler 150 indicating that the next-in-order stage conflict section processing of the next-in-order packet has completed, that the next-in-order stage processing of the next-in-order packet is continuing, and that the next-in-order stage is available to process the subsequent next-in-order packet, the hardware scheduler 150 sets the Stage Barrier Indicator value in the next-in-order stage entry in the Stream Workflow Table corresponding to the next-in-order packet's Stream ID to the Available indicator to indicate that the next-in-order stage is available to process the subsequent next-in-order packet. In response to the next-in-order stage becoming available, the remainder of the method at block 614 proceeds, as previously described with reference to FIG. 6. The method also proceeds to block 808.

At block 808, the hardware scheduler 150 adds the next-in-order packet to the tail of the stage continuation queue for the next-in-order stage with the packet status indicator value set to the Continuation indicator to identify the next-in-order stage processing of the next-in-order packet as continuing, thereby maintaining the stage continuation queue in data stream packet order, where the pointer to the memory location of the stage continuation queue is contained in the next-in-order stage entry in the Stream Workflow Table corresponding to the next-in-order packet's Stream ID. The method proceeds back to block 602 to wait for a next-in-order packet to become available, as previously described with respect to FIG. 6.

At block 810, the one or more enabled processing elements continue execution of the remainder of the sub-algorithm for the next-in-order stage of the data stream pipeline to process the next-in-order packet. Upon completion of the sub-algorithm for the next-in-order stage, the method proceeds to block 812.

At block 812, one of the enabled processing elements communicates a packet stage completed indicator to the hardware scheduler 150 indicating that the next-in-order stage processing of the next-in-order packet has completed, and that the next-in-order packet is ready to proceed to the subsequent next-in-order stage, the hardware scheduler method proceeds to block 814 and the processing elements method proceeds back to block 802 to wait for being enabled by the hardware scheduler 150.

At block 814, the hardware scheduler 150 sets the packet status indicator value to the Completed indicator contained in the entry for the next-in-order packet in the stage continuation queue for the next-in-order stage to identify the next-in-order stage processing of the next-in-order packet as completed and the next-in-order packet is ready to proceed to subsequent next-in-order stage processing, the method proceeds to block 816.

At block 816, the hardware scheduler 150 determines if the next-in-order stage that just completed was the last-in-order stage of the data stream pipeline for the next-in-order packet. For purposes of discussion, it is presumed that stages of each data stream pipeline have consecutively numbered stage numbers, where the first-in-order stage's stage number has the value of zero, as described above with reference to FIG. 6. If the next-in-order stage was the last-in-order stage, for example, the number of stages contained in the Stream Context Table entry for the next-in-order packet's Stream ID is the same as the next-in-order stage's stage number plus one, the method proceeds back to block 602 to wait for a next-in-order packet to become available, as described above with respect to FIG. 6. If the next-in-order stage was not the last-in-order stage, for example, the number of stages is greater than the next-in-order stage's stage number plus one, the method proceeds to block 818.

At block 818, the hardware scheduler 150 de-queues and makes each next-in-order packet in the stage continuation queue for the next-in-order stage available for subsequent next-in-order stage processing, where each next-in-order packet in the stage continuation queue has the packet status indicator value of the Completed indicator, the method proceeds to block 610 and proceeds as described previously with respect to FIG. 6.

Figure 9:
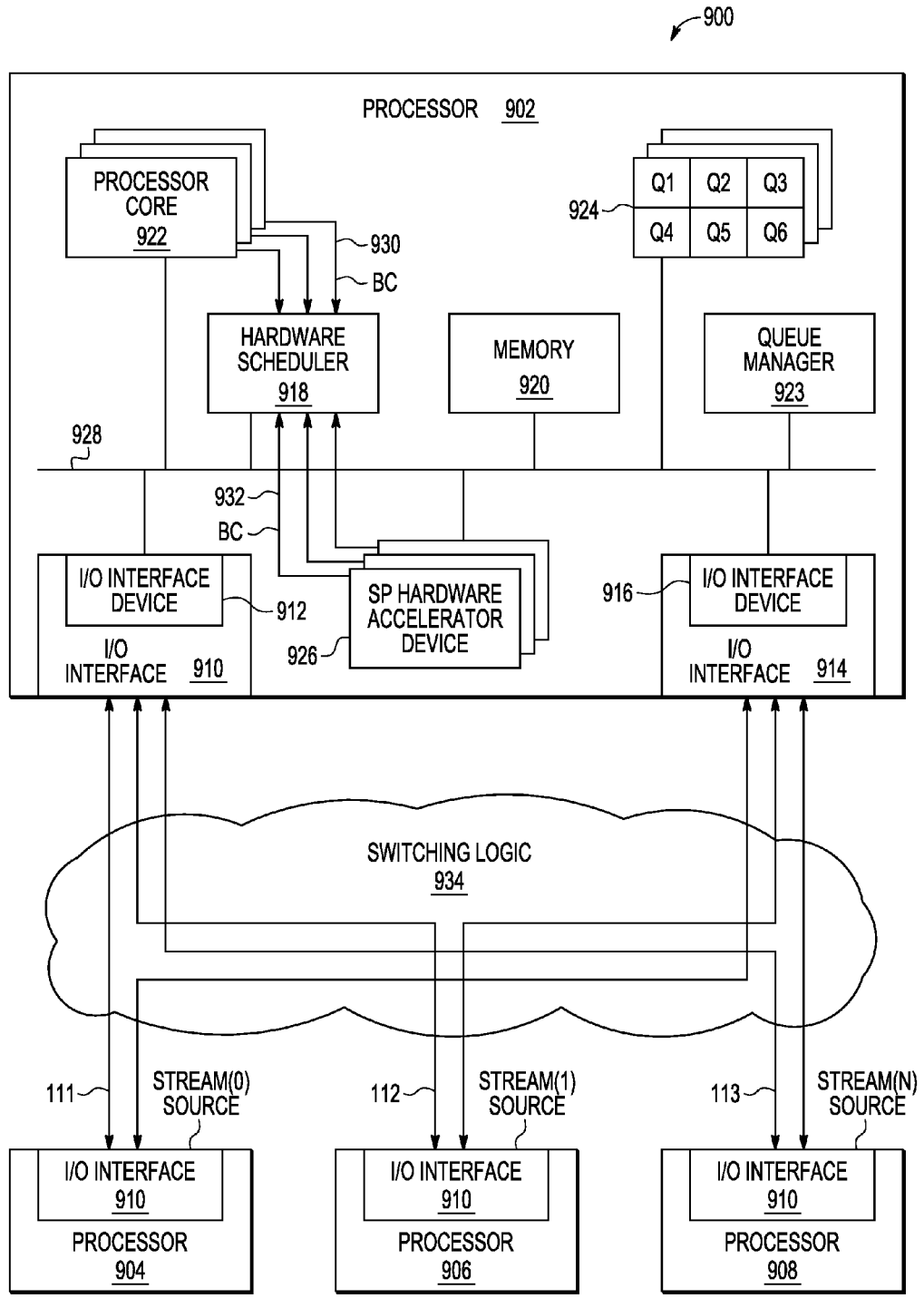
FIG. 9 illustrates a processing system that schedules processing of data stream packets in a pipelined manner in accordance with at least one embodiment of the present disclosure.

FIG. 9 illustrates a processing system that schedules processing of data stream packets in a pipelined manner. The processing system 900 includes processors 902, 904, 906, and 908 (processors 902-908) and switching logic 934 in accordance with at least one embodiment of the present disclosure. In an embodiment, the processing system 900 is a system on a chip (SoC), such that each of the processors 902-908 is included within the same SoC. In another embodiment, the processing system 900 can be an integrated circuit die, a packaged device that can include one or more integrated circuit die, a printed circuit board that can include one or more packaged devices and integrated circuit die, the like, and combinations thereof. In an embodiment, the switching logic 934 can be the Internet, a local area network, a crossbar switch and the like.

Each of the processors 902-908 includes multiple input/output (I/O) interfaces 910, and 914, illustrated for processor 902, but I/O interface 914 has not been shown in processors 904, 906, and 908, in FIG. 9 for simplicity. Processor 902 includes I/O interface devices 912, and 916, within I/O interfaces 910, and 914, respectively. The processor 902 also includes a hardware scheduler 918, a queue manager 923, multiple queues 924, multiple processor cores 922, multiple special purpose (SP) hardware accelerator devices 926, also referred to herein as specific purpose processing devices, which can be hardware devices, and a memory 920. The processor 902 also includes a set of barrier clear interconnects 930, and 932, to enable each one of the processor cores 922, and each one of the specific purpose processing devices 926, respectively, to communicate its specific barrier clear indicator information to the hardware scheduler 918. The processor 902 also includes an interconnect 928 to enable the devices of processor 902 to communicate with one another.

Each of the other processors 904, 906, and 908 can also include I/O interface devices 912, and 916, within I/O interfaces 910, and 914, respectively, a hardware scheduler 918, a queue manager 923, multiple queues 924, multiple processor cores 922, multiple special purpose (SP) hardware accelerator devices 926, a memory 920, a set of barrier clear interconnects 930, and 932, and an interconnect 928, but these have not been shown in FIG. 9 for simplicity. Each of the processors 902-908 is connected to the switching logic 934 via its I/O interfaces 910, and 914. Each of the processors 902-908 is connected to each of the other processors 902-908 via the switching logic 934, and can operate as a destination processor and/or a source processor for receiving and sending messages, respectively. In an embodiment, the packets 114 can be transferred between the processors 902-908 by the switching logic 934, which can be a cross-point switch implemented in hardware, software, and the like.

A particular ordered data stream 111 illustrates an example of communication of packets 114 of the ordered data stream 111 between processor 904 and processor 902 via a communication path through the switching logic 934. Based upon header information 115 in the packets 114 of the ordered data stream 111, the switching logic 934 determines that the packets 114 are addressed to the processor 902, and routes the packets 114 out of the switching logic 934 coupled to the processor 902 through I/O interface 910 to the processor 902.

A communication path can include: an intra-die communication path, wherein packets 114 are transmitted between processors of a common integrated circuit die; or, an inter-die communication path, wherein packets 114 are transmitted between processors 902-908 on different die. For example, the processors 902-908 can reside on separate die that are mounted to a common substrate, such as to a printed circuit board, to a package substrate, and the like.

The processor 902 is described herein as receiving packets 114 of the ordered data streams 111-113, from source processors 904, 906 and 908, respectively, processing each of the packets 114 from each of the ordered data streams 111,112, and 113 in data stream packet order, using a specific pipelined data stream processing algorithm, where the specific pipelined data stream processing algorithm is based on the specific ordered data stream 111-113 that each packet 114 belongs to, and transmitting each processed packet 114 in its corresponding output ordered data stream 111-113 back to destination processors 904, 906 and 908, where data stream packet order within each output ordered data stream 111-113 is maintained. As described, processor 902 may be referred to as a pipelined scheduler data stream processing processor 902. Each one of the processors 902-908 can operate as a pipelined scheduler data stream processing processor for processing packets 114 of ordered data streams 111-113. However, for simplicity it is presumed that processor 902 is operating as a pipelined scheduler data stream processing processor and processors 904, 906, and 908 are operating as source processers that provide packets 114 of input ordered data streams 111-113 and as destination processors that receive processed packets 114 of output ordered data streams 111-113. It will be appreciated that in various embodiments, processor 902 can also be a source processor that provides packets 114 of input ordered data streams 111-113 to another pipelined scheduler data stream processing processor 904, 906, and 908 for processing, and a destination processor that receives processed packets 114 of output ordered data streams 111-113 from the pipelined scheduler data stream processing processor 904, 906, and 908. In various other embodiments, processors 902, 904, 906 and 908 can be source processors, pipelined scheduler data stream processing processors, and destination processors, or combinations thereof. For simplicity, the pipelined data stream processing algorithms and the scheduling and processing of packets 114 of ordered data streams 111-113 will be discussed only with respect to processor 902.

In the example embodiment, when the I/O interface 910 of the processor 902 receives a packet 114 of an ordered data stream 111-113, the I/O interface device 912 performs packet classification to determine which specific ordered data stream 111-113 the packet 114 belongs to, and the packet's Stream ID and sequence number, as previously described with respect to FIG. 1.

Upon completing packet classification, the I/O interface device 912 determines if the packet 114 is the first-in-order packet of its specific ordered data stream 111-113. If the packet 114 is the first-in-order packet of its specific ordered data stream 111-113, for example, the packet's sequence number has the value of zero, the sequence number has a value corresponding to a pre-defined starting sequence number for its specific order data stream 111-113, or this is the first packet of its specific ordered data stream 111-113 that has been seen by the I/O interface device 912, the Queue Manager 923 allocates an input packet data stream queue 141-143 in the multiple queues 924 and associates the input packet data stream queue 141-143 with the packet 114, hence the packet's Stream ID and its specific ordered data stream 111-113. In a similar manner, the Queue Manager 923 may also allocate an output packet data stream queue 191-193 in the multiple queues 924 associated with the packet 114, the packet's Stream ID and its specific ordered data stream 111-113.

The I/O interface device 912 adds the packet 114 to its associated input packet data stream queue 141-143 in data stream packet order. The I/O interface device 912 also updates a last packet received time associated with the packet's specific ordered data stream 111-113, hence the packet's Stream ID, with the current time, indicating that the last packet received time is the time that packet 114 was just added to its input packet data stream queue 141-143. The I/O interface device 912 can notify the hardware scheduler 918 when the packet 114 has been added to its associated input packet data stream queue 141-143 and is the next-in-order packet that is available for processing, which is when the packet 114 has been added at the head of its queue that was previously empty. Alternatively, the hardware scheduler 918 determines the next-in-order packet in each one of the input packet data stream queues 141-143 that is available. The I/O interface device 912 then waits for the arrival of another packet 114, before proceeding as described above. (Reference FIG. 1 description above.)

When a next-in-order packet becomes available in an input packet data stream queue 141-143, the hardware scheduler 918 de-queues the next-in-order packet from its input packet data stream queue 141-143 and determines if the next-in-order packet is the first-in-order packet of its ordered data stream 111-113, as previously described. If the next-in-order packet is the first-in-order packet, the hardware scheduler 918 determines if the data stream resources for the first-in-order packet's ordered data stream 111-113 have been allocated. For purposes of discussion, it is presumed that a Stream Context Table, for example Table 1, that is global relative to the plurality of ordered data streams 111-113, and a plurality of Stream Workflow (Stage) Tables, for example Table 2 and Table 3, one for each ordered data stream 111-113, have been allocated, initialized and stored in hardware scheduler 918 data structures located in memory 920 during any type of configuration process prior to any data being received at I/O interfaces 910 and 914 of processor 902, as previously described with reference to FIG. 1. The hardware scheduler 918 will determine that the data stream resources for the first-in-order packet's ordered data stream 111-113 have already been allocated.

The hardware scheduler 918 determines the next-in-order stage of the data stream pipeline that is to process the next-in-order packet. If the next-in-order packet became available from its input packet data stream queue 141-143, the next-in-order stage is the first-in-order stage of the data stream pipeline. If the next-in-order packet became available after current stage processing of the next-in-order packet completed, the next-in-order stage is the subsequent next-in-order stage following the current stage that just completed. For example, if the next-in-order packet just completed Stage(0,0), then the next-in-order stage is Stage(0,1), as previously described with reference to FIGS. 1 and 2.

In response to determining the next-in-order stage to process the next-in-order packet, the hardware scheduler 918 determines if the next-in-order stage of the data stream pipeline is blocked. The hardware scheduler 918 uses the next-in-order packet's Stream ID to locate the entry in the Stream Context Table that contains the location of the next-in-order packet's Stream Workflow Table. If the next-in-order stage is blocked, for example, the Stage Barrier Indicator value has the Blocked indicator in the Stream Workflow Table entry corresponding to the next-in-order stage, the hardware scheduler 918 adds the next-in-order packet to the tail of the Blocked Queue in the Stream Workflow Table entry and then waits until the next-in-order stage becomes available before proceeding with processing of the next-in-order packet. In addition, the hardware scheduler 918 waits for another next-in-order packet to become available before proceeding as described above. In response to the next-in-order stage becoming available, the hardware scheduler 918 de-queues the packet 114 at the head of the Blocked Queue in the Stream Workflow Table entry, which becomes the next-in-order packet to be processed by the next-in-order stage, and proceeds with processing the next-in-order packet. For example, in response to receiving a barrier clear indicator for the next-in-order stage, the hardware scheduler 918 clears the barrier for the next-in-order stage by setting the Stage Barrier Indicator value to the Available indicator in the Stream Workflow Table entry corresponding to the next-in-order stage. If the next-in-order stage is not blocked (is available), for example, the Stage Barrier Indicator value has the Available indicator in the Stream Workflow Table entry corresponding to the next-in-order stage, the hardware scheduler 918 continues processing of the next-in-order packet.

As previously described with reference to FIG. 1, the hardware scheduler 918 sets the barrier for the next-in-order stage to block processing of any additional packets 114 of the next-in-order packet's ordered data stream 111-113, assigns one or more available and appropriate processing elements 922 and/or 926 to the next-in-order stage, and enables the one or more processing elements 922 and/or 926 to execute the next-in-order stage's sub-algorithm to process the next-in-order packet. The one or more enabled processing elements may include processor cores 922 and/or special purpose hardware accelerator devices 926, also referred to herein as specific purpose processing devices which may be specific purpose hardware processing devices.

The hardware scheduler 918 and the processing elements 922 and 926 are coupled to memory 920 where the next-in-order stage's stream context data, a set of instructions and/or commands, and the like, can be accessed. For example, the hardware scheduler 918 may block the next-in-order stage by setting the Barrier Indicator value to the Blocked indicator in the Stream Workflow Table entry corresponding to the next-in-order stage. The hardware scheduler 918 may determine the resources required to implement the next-in-order stage of the data stream pipeline including the specific type and number of processing elements and the sub-algorithm, such as a set of instructions and/or a list of commands, from the next-in-order stage's workflow information. The pointer to the location in memory 920 where the next-in-order stage's workflow information can be accessed is contained in the Stream Workflow Table entry for the next-in-order stage. The pointer to the location in memory 920 where the stream context data can be accessed is contained in the Stream Context Table in the entry for the next-in-order packet's Stream ID. The hardware scheduler 918 may communicate the information that enables the one or more assigned processing elements 922 and/or 926 via interconnect 928 coupling the hardware scheduler 918 to the processing elements 922 and 926, for example, processor cores 922 and special purpose hardware accelerator devices 926. In another embodiment, the hardware scheduler 918 may communicate this information via memory 920. After enabling the processing elements 922 and/or 926, the hardware scheduler 918 waits for another next-in-order packet to become available before proceeding as described above.

In response to being enabled by the hardware scheduler 918, the one or more enabled processing elements 922 and/or 926 executes the sub-algorithm for the next-in-order stage of the data stream pipeline to process the next-in-order packet, and to perform any conflict section processing including accesses and updates to the next-in-order stage's corresponding stage segment of the stream context data. Upon completion, one of the enabled processing elements 922 and/or 926 communicates a barrier clear indicator to the hardware scheduler 918 indicating that the next-in-order stage processing of the next-in-order packet has completed, that the next-in-order stage is available to process a subsequent next-in-order packet, and that the next-in-order packet is ready to proceed to the subsequent next-in-order stage. The processing element 922 and/or 926 may communicate the barrier clear indicator to hardware scheduler 918 via the corresponding interconnects 930 and/or 932. Alternatively, the processing element 922 and/or 926 may communicate the barrier clear indicator to the hardware scheduler 918 via a pre-defined memory location in memory 920, the interconnect 928, a dedicated register and/or dedicated register bit within a register within the processor 902, or by executing a dedicated instruction. After communicating the barrier clear indicator, the one or more processing elements 922 and/or 926 become available for further assignment.

In response to the barrier clear indicator being communicated from one of the enabled processing elements 922 and/or 926 to the hardware scheduler 918 indicating that the next-in-order stage processing of the next-in-order packet has completed, that the next-in-order stage is available to process a subsequent next-in-order packet, and that the next-in-order packet is ready to proceed to the subsequent next-in-order stage, the hardware scheduler 918 clears the barrier to make the next-in-order stage available, for example, by setting the Stage Barrier Indicator value in the Stream Workflow Table entry for the next-in-order stage to the Available indicator. In response to the next-in-order stage becoming available, the hardware scheduler 918 may resume processing of a subsequent next-in-order packet that was waiting in the Blocked Queue in the Stream Workflow Table entry for the next-in-order stage as described above.

In further response to the barrier clear indicator being communicated, the hardware scheduler 918 determines if the next-in-order stage that just completed was the last-in-order stage of the data stream pipeline. In the example embodiment, it is presumed that stages of each data stream pipeline have consecutively numbered stage numbers, where the first-in-order stage's stage number has the value of zero. If the next-in-order stage was the last-in-order stage, for example, the number of stages contained in the Stream Context Table entry for the next-in-order packet's Stream ID is the same as the next-in-order stage's stage number plus one, the hardware scheduler 918 adds the next-in-order packet to its associated output packet data stream queue 191-193 in data stream packet order, and waits for another next-in-order packet to become available before proceeding as described above. If the next-in-order stage was not the last-in-order stage, for example, the number of stages is greater than the next-in-order stage's stage number plus one, the hardware scheduler 918 determines the subsequent next-in-order stage that is to process the next-in-order packet and proceeds as previously described.

In another embodiment, the hardware scheduler 918 may determine for each one of the Stream Context Table entries if the last packet received time associated with a specific ordered data stream has exceeded its inactivity threshold time. If the inactivity threshold time has been exceeded, the hardware scheduler 918 may de-allocate and free up the data stream resources that are associated with the specific ordered data stream to make the data stream resources available for other ordered data streams.

In this manner, the I/O interface device 912 of the pipelined scheduler data stream processing processor 902 makes next-in-order packets available to the hardware scheduler 918 for pipelined packet data stream processing in parallel to the hardware scheduler 918 operation. The hardware scheduler 918, within processor 902, ensures, through the use of scheduler stage barriers, that each packet of its ordered data stream is processed through each stage of the corresponding data stream pipeline in stage order and data stream packet order, that subsequent next-in-order packets to the next-in-order packet being processed are prevented from entering an occupied stage, that accesses and updates to each stage's stage segment of the stream context data are done atomically as only one packet 114 can occupy a stage at a time, that an occupied stage only becomes available when a barrier clear indicator for the occupied stage is received that indicates the occupied stage processing of the next-in-order packet has completed, and that each packet completes processing through its corresponding data stream pipeline in data stream packet order.

It will be appreciated that the memories disclosed herein can be implemented in various manners using various types of memory. Furthermore, it will be appreciated that various queues can be implemented using physical queues, virtual queues, and the like.

In a first aspect, a method can include determining a task to be performed on each packet of a data stream, the task comprising a plurality of task portions including a first task portion and a second task portion, determining that the first task portion of the plurality of task portions is to process a first data packet of the data stream, in response to determining, at a first time, that a first storage location stores a first barrier indicator, enabling the first task portion to process the first data packet and storing a second barrier indicator at the first storage location, determining, after the first time, that the first task portion is to process a second data packet that is next-in-order to the first data packet, in response to determining, at a second time after the first time, that the first storage location stores the second barrier indicator, preventing the first task portion from processing the second data packet, in response to a first barrier clear indicator from the first task portion, at a third time after the second time, storing the first barrier indicator at the first storage location, and in response to storing the first barrier indicator at the third time, enabling, at a fourth time, the first task portion to process the second data packet.

In one embodiment of the first aspect, enabling the first task portion to process the first data packet includes enabling a first processing element to execute the first task portion, and enabling the first task portion to process the second data packet includes enabling a second processing element to execute the first task portion.

In a particular embodiment, the first processing element and the second processing element are general purpose instruction-based processors.

In another particular embodiment, the first processing element and the second processing element are specific purpose processing devices.

In another embodiment, enabling the first task portion to process the first data packet includes enabling a first processing element to execute the first task portion, and enabling the first task portion to process the second data packet includes enabling the first processing element to execute the first task portion.

In a further embodiment of the first aspect, the second task portion is next-in-order after the first task portion to process the first data packet, subsequent to the first barrier clear indicator from the first task portion and in response to determining that a second storage location stores the first barrier indicator, enabling the second task portion to process the first data packet.

In yet another embodiment of the first aspect, the second task portion is next-in-order after the first task portion to process the first data packet, and subsequent to the first barrier clear indicator from the first task portion and in response to determining that a second storage location stores the second barrier indicator, preventing the second task portion from processing the first data packet.

In yet a further embodiment, the first barrier clear indicator from the first task portion indicates that the first task portion processed the first data packet successfully, and that further processing of the data stream can continue in response to the successful completion.

In still another embodiment, the first barrier clear indicator from the first task portion indicates that an exception occurred during the first task portion to process the first data packet, wherein no further processing of the first data packet of the data stream will be performed in response to the exception.

In still a further embodiment, the first barrier clear indicator from the first task portion is a signal that the first task portion asserts by processing a dedicated instruction.

In yet a further embodiment of the first aspect, the first barrier clear indicator from the first task portion is stored at a third storage location that the first task portion updates by writing to the third storage location.

In a further particular embodiment, the third storage location is a register.

In a second aspect, a processing system can include a first processing element, a second processing element, a hardware scheduler module coupled to the first processing element and the second processing element, and a storage location coupled to the hardware scheduler module, the first processing element, and the second processing element, the hardware scheduler module being configured to: determine a task to be performed on each packet of a data stream, the task comprising a first task portion and a second task portion, determine that the first task portion is to be performed on a first data packet of the data stream, determine that the storage location stores a first barrier indicator, and in response, to direct the first processing element to perform the first task portion on the first data packet and store a second barrier indicator at the storage location, determine that the first task portion is to be performed on a second data packet that is next-in-order to the first data packet, determine that the storage location stores the second barrier indicator, and in response, prevent the first task portion from being performed on the second data packet, receive a first barrier clear indicator from the first processing element, and in response, to store the first barrier indicator at the storage location, and in response to storing the first barrier indicator, direct the second processing element to perform the first task portion on the second data packet.

In one embodiment of the second aspect, the processing system further includes: a second storage location coupled to the hardware scheduler module, the first processing element, and the second processing element, wherein: the first task portion comprising a first task conflict section portion and a first task end portion, the first task conflict section portion is operable to access and update shared context data at the second storage location, the shared context data is associated with the data stream and the first task portion, and the first barrier clear indicator from the first processing element indicates that: the performance of the first task conflict section portion on the first data packet has completed, the first processing element will perform the first task end portion on the first data packet, and the first task portion is available to be performed on the second data packet.

In a particular embodiment, the hardware scheduler module is further configured to: receive a ready to proceed to next task portion indicator from the first processing element, and in response, determine that the second task portion that is next-in-order to the first task portion is to be performed on the first data packet, wherein the ready to proceed to next task portion indicator indicates that the performance of the first task end portion on the first data packet has completed, and determine that the second storage location storing the first barrier indicator, and in response, direct the first processing element to perform the second task portion on the first data packet.

In another particular embodiment, the processing system further includes: a second storage location coupled to the hardware scheduler module, the first processing element, and the second processing element, wherein: the first task portion comprising a first task conflict section portion, the first task conflict section portion is operable to access and update shared context data at the second storage location, the shared context data is associated with the data stream and the first task portion, the processing system further comprising a hardware mechanism operable to allow the first task conflict section portion to access and update the shared context data if the first processing element to perform the first task conflict section portion has access and update permissions for the shared context data, the processing system is configured to utilize the hardware mechanism to enforce the access and update permissions, and the first processing element is configured to have the access and update permissions when performing the first task conflict section portion.

In another embodiment, the first processing element and the second processing element are general purpose instruction-based processor cores.

In a further embodiment of the second aspect, the first processing element and the second processing element are specific purpose processing devices.

In yet another embodiment of the second aspect, the first processing element and the second processing element are the same processing element.

In a third aspect, a method can include determining that a first data packet of a data stream is an initial data packet of the data stream, in response to determining that a first storage location stores a null data stream resources pointer, allocating the data stream resources at a second storage location and storing the address of the second storage location at the first storage location, determining a task to be performed on each packet of the data stream, the task comprising a plurality of task portions including a first task portion and a second task portion, determining that the first task portion of the plurality of task portions is to process the first data packet, in response to determining, at a first time, that a third storage location stores a first barrier indicator, enabling the first task portion to process the first data packet and storing a second barrier indicator at the third storage location, determining, after the first time, that the first task portion is to process a second data packet that is next-in-order to the first data packet, in response to determining, at a second time after the first time, that the third storage location stores the second barrier indicator, preventing the first task portion from processing the second data packet, in response to a first barrier clear indicator, at a third time after the second time, storing the first barrier indicator at the third storage location, and in response to storing the first barrier indicator, enabling, at a fourth time, the first task portion to process the second data packet.

The previous description in combination with the Figures is provided to assist in understanding the teachings disclosed herein. The previous discussion focused on specific implementations and embodiments of the disclosure. This focus was provided to assist in describing the disclosure and should not be interpreted as a limitation on the scope or applicability of the disclosed.

Based upon the description herein, it will be appreciated that the preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
   determining a task to be performed on each packet of a data stream, the task comprising a plurality of task portions including a first task portion and a second task portion;
   determining that the first task portion of the plurality of task portions is to process a first data packet of the data stream;
   in response to determining, at a first time, that a first storage location stores a first barrier indicator, enabling the first task portion to process the first data packet and storing a second barrier indicator at the first storage location;
   determining, after the first time, that the first task portion is to process a second data packet that is next-in-order to the first data packet;
   in response to determining, at a second time after the first time, that the first storage location stores the second barrier indicator, preventing the first task portion from processing the second data packet;
   in response to a first barrier clear indicator, at a third time after the second time, storing the first barrier indicator at the first storage location;
   in response to storing the first barrier indicator, enabling, at a fourth time, the first task portion to process the second data packet;
   wherein:
   the first task portion comprising a first task conflict section portion and a first task end portion;

the first task conflict section portion is operable to access and update shared context data at the second storage location;

the shared context data is associated with the data stream and the first task portion; and the first barrier clear indicator from the first processing element indicates that:

the performance of the first task conflict section portion on the first data packet has completed;

the first processing element is to perform the first task end portion on the first data packet; and the first task portion is available to be performed on the second data packet.

2. The method of claim 1, wherein enabling the first task portion to process the first data packet includes enabling a first processing element to execute the first task portion, and wherein enabling the first task portion to process the second data packet includes enabling a second processing element to execute the first task portion.

3. The method of claim 2, wherein the first processing element and the second processing element are general purpose instruction-based processors.

4. The method of claim 2, wherein the first processing element and the second processing element are specific purpose processing devices.

5. The method of claim 1, wherein enabling the first task portion to process the first data packet includes enabling a first processing element to execute the first task portion, and enabling the first task portion to process the second data packet includes enabling the first processing element to execute the first task portion.

6. The method of claim 1, wherein the second task portion is next-in-order after the first task portion to process the first data packet, subsequent to the first barrier clear indicator from the first task portion and in response to determining that a second storage location stores the first barrier indicator, enabling the second task portion to process the first data packet.

7. The method of claim 1, wherein the second task portion is next-in-order after the first task portion to process the first data packet, and subsequent to the first barrier clear indicator from the first task portion and in response to determining that a second storage location stores the second barrier indicator, preventing the second task portion from processing the first data packet.

8. The method of claim 1, wherein the first barrier clear indicator from the first task portion indicates that the first task portion processed the first data packet successfully, and that further processing of the data stream can continue in response to the successful completion.

9. The method of claim 1, wherein the first barrier clear indicator from the first task portion indicates that an exception occurred during the first task portion to process the first data packet, wherein no further processing of the first data packet of the data stream is to be performed in response to the exception.

10. The method of claim 1, wherein the first barrier clear indicator from the first task portion is a signal that the first task portion asserts by processing a dedicated instruction.

11. The method of claim 1, wherein the first barrier clear indicator from the first task portion is stored at a third storage location that the first task portion updates by writing to the third storage location.

12. The method of claim 11, wherein the third storage location is a register.

13. A processing system comprising:
a first processing element;
a second processing element;
a hardware scheduler module coupled to the first processing element and the second processing element; and
a storage location coupled to the hardware scheduler module, the first processing element, and the second processing element;
the hardware scheduler module being configured to:
determine a task to be performed on each packet of a data stream, the task comprising a first task portion and a second task portion;
determine that the first task portion is to be performed on a first data packet of the data stream;
determine that the storage location stores a first barrier indicator, and in response, to direct the first processing element to perform the first task portion on the first data packet and store a second barrier indicator at the storage location;
determine that the first task portion is to be performed on a second data packet that is next-in-order to the first data packet;
determine that the storage location stores the second barrier indicator, and in response, prevent the first task portion from being performed on the second data packet;
receive a first barrier clear indicator from the first processing element, and in response, to store the first barrier indicator at the storage location;
in response to storing the first barrier indicator, direct the second processing element to perform the first task portion on the second data packet;
a second storage location coupled to the hardware scheduler module, the first processing element, and the second processing element;
wherein:
the first task portion comprising a first task conflict section portion and a first task end portion;
the first task conflict section portion is operable to access and update shared context data at the second storage location;
the shared context data is associated with the data stream and the first task portion; and
the first barrier clear indicator from the first processing element indicates that:
the performance of the first task conflict section portion on the first data packet has completed;
the first processing element is to perform the first task end portion on the first data packet; and
the first task portion is available to be performed on the second data packet.

14. The processing system of claim 13, wherein
the hardware scheduler module is further configured to:
receive a ready to proceed to next task portion indicator from the first processing element, and in response, determine that the second task portion that is next-in-order to the first task portion is to be performed on the first data packet, wherein the ready to proceed to next task portion indicator indicates that the performance of the first task end portion on the first data packet has completed; and
determine that the second storage location storing the first barrier indicator, and in response, direct the first processing element to perform the second task portion on the first data packet.

15. The processing system of claim 13, further comprising:

a second storage location coupled to the hardware scheduler module, the first processing element, and the second processing element;

wherein:

the first task portion comprising a first task conflict section portion, the first task conflict section portion is operable to access and update shared context data at the second storage location, the shared context data is associated with the data stream and the first task portion;

the processing system further comprising a hardware mechanism operable to allow the first task conflict section portion to access and update the shared context data if the first processing element to perform the first task conflict section portion has access and update permissions for the shared context data;

the processing system is configured to utilize the hardware mechanism to enforce the access and update permissions; and the first processing element is configured to have the access and update permissions when performing the first task conflict section portion.

16. The processing system of claim 13, wherein the first processing element and the second processing element are general purpose instruction-based processor cores.

17. The processing system of claim 13, wherein the first processing element and the second processing element are specific purpose processing devices.

18. The processing system of claim 13, wherein the first processing element and the second processing element are the same processing element.

19. A method comprising:

determining that a first data packet of a data stream is an initial data packet of the data stream;

in response to determining that a first storage location stores a null data stream resources pointer, allocating the data stream resources at a second storage location and storing the address of the second storage location at the first storage location;

determining a task to be performed on each packet of the data stream, the task comprising a plurality of task portions including a first task portion and a second task portion;

determining that the first task portion of the plurality of task portions is to process the first data packet;

in response to determining, at a first time, that a third storage location stores a first barrier indicator, enabling the first task portion to process the first data packet and storing a second barrier indicator at the third storage location;

determining, after the first time, that the first task portion is to process a second data packet that is next-in-order to the first data packet;

in response to determining, at a second time after the first time, that the third storage location stores the second barrier indicator, preventing the first task portion from processing the second data packet;

in response to a first barrier clear indicator, at a third time after the second time, storing the first barrier indicator at the third storage location;

in response to storing the first barrier indicator, enabling, at a fourth time, the first task portion to process the second data packet;

wherein:

the first task portion comprising a first task conflict section portion and a first task end portion;

the first task conflict section portion is operable to access and update shared context data at the second storage location;

the shared context data is associated with the data stream and the first task portion; and the first barrier clear indicator from the first processing element indicates that:

the performance of the first task conflict section portion on the first data packet has completed;

the first processing element is to perform the first task end portion on the first data packet; and the first task portion is available to be performed on the second data packet.

\* \* \* \* \*